US012561998B2

(12) United States Patent
Gong et al.

(10) Patent No.: US 12,561,998 B2
(45) Date of Patent: Feb. 24, 2026

(54) SYNTHETIC DATA FINE-TUNED OPTICAL CHARACTER RECOGNITION ENGINE FOR EXTENSIBLE MARKUP LANGUAGE DOCUMENT RECONSTRUCTION

(71) Applicant: Oracle International Corporation, Redwood Shores, CA (US)

(72) Inventors: Liyu Gong, Austin, TX (US); Yuying Wang, Seattle, WA (US); Mengqing Guo, Redmond, WA (US); Tao Sheng, Bellevue, WA (US); Jun Qian, Bellevue, WA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 321 days.

(21) Appl. No.: 18/131,744

(22) Filed: Apr. 6, 2023

(65) Prior Publication Data

US 2024/0338958 A1      Oct. 10, 2024

(51) Int. Cl.
G06V 30/19        (2022.01)
G06F 40/143      (2020.01)
G06V 10/70        (2022.01)

(52) U.S. Cl.
CPC ...... G06V 30/19147 (2022.01); G06F 40/143 (2020.01); G06V 10/70 (2022.01)

(58) Field of Classification Search
CPC . G06V 30/19147; G06V 10/70; G06F 40/143
See application file for complete search history.

(56) References Cited

U.S. PATENT DOCUMENTS 12,100,152 B1 *   9/2024   Nguyen .................... G06T 3/40
2005/0289182 A1   12/2005   Pandian et al.
(Continued)

FOREIGN PATENT DOCUMENTS

CN        112507909 A      3/2021
CN        114022891 A      2/2022
(Continued)

OTHER PUBLICATIONS

M. D. Alahmadi, "VID2XML: Automatic Extraction of a Complete XML Data From Mobile Programming Screencasts," in IEEE Transactions on Software Engineering, vol. 49, No. 4, pp. 1726-1740, Apr. 1, 2023. (Year: 2023).*
(Continued)

*Primary Examiner* — Michelle M Koeth
(74) *Attorney, Agent, or Firm* — Kilpatrick Townsend & Stockton LLP

(57)      ABSTRACT

Techniques are disclosed for optical character recognition of extensible markup language content. A method can include a system generating a first training data comprising extensible markup language (XML) content, the first training data comprising a first plurality of training instances, each training instance including a respective image comprising XML content and annotation information for the respective image. The system can train a plurality of machine learning models using the first training data to generate a plurality of trained machine learning models, to perform image-based XML content extraction. The system can generate a plurality of trained machine learning models based at least in part on the training.

20 Claims, 16 Drawing Sheets

(56)                References Cited

U.S. PATENT DOCUMENTS

2010/0080493 A1     4/2010  McGatha et al.
2024/0289587 A1*    8/2024  Schilders ............... G06N 3/084

FOREIGN PATENT DOCUMENTS

KR        20180033787 A      4/2018
WO        2021139342 A1      7/2021

OTHER PUBLICATIONS

Reul et al., "OCR4all—An Open-Source Tool Providing a (Semi-)Automatic OCR Workflow for Historical Printings," arXiv:1909.04032v1 [cs.CV], Sep. 9, 2019. (Year: 2019).*

"From Pixels to True XML Structures in Digital Document Images", Available Online at: https://www.worldscientific.com/doi/abs/10.1142/S0218001404003575, 2023, 2 pages, Abstract only.

"Sahana OCR", Available Online at: https://wiki.sahanafoundation.org/agasti/ocr/start, 4 pages.

"SEEOcta Data: Optical Character Recognition (OCR)", Available Online at: https://blog.seeburger.com/seeocta-data-optical-character-recognition-ocr/, Jun. 30, 2021, 6 pages.

Clausner et al., "Efficient and Effective OCR Engine Training", International Journal on Document Analysis and Recognition (IJDAR), vol. 23, Oct. 30, 2019, pp. 73-88.

Journet et al., "DocCreator: A New Software for Creating Synthetic Ground-Truthed Document Images", Journal of Imaging, vol. 3, Available Online at: https://hal.archives-ouvertes.fr/hal-01668915/file/jimaging.pdf, Dec. 2017, 18 pages.

Lenc et al., "HDPA: Historical Document Processing and Analysis Framework", Evolving Systems, vol. 12, No. 2, May 20, 2020, 10 pages, Abstract Only.

Visalli et al., "A Two Step Fine-tuning Approach for Text Recognition on Identity Documents", Proceedings of the 13th International Conference on Agents and Artificial Intelligence, vol. 2, Jan. 2021, pp. 837-844.

* cited by examiner

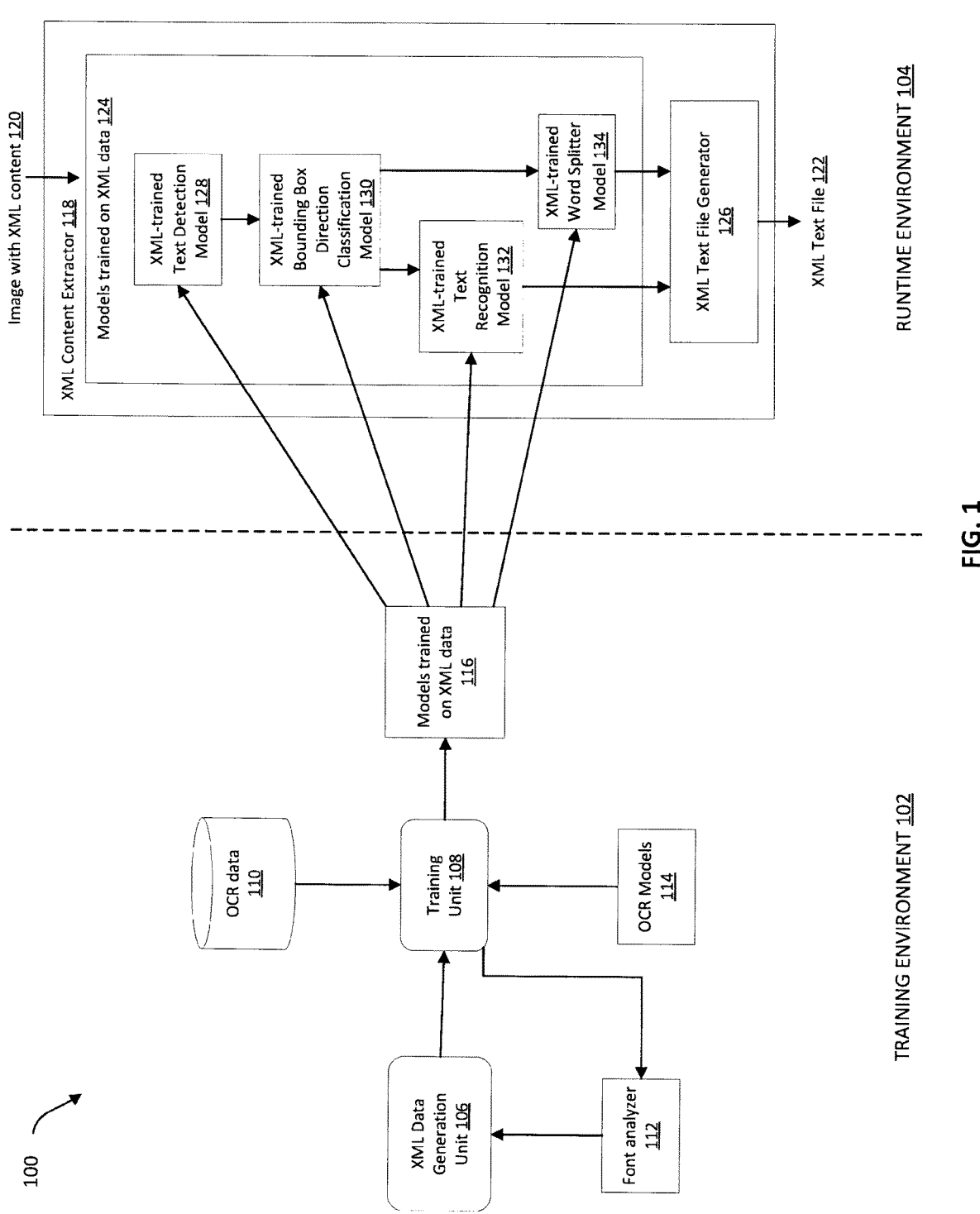

100

XML Content Extractor 118

Image with XML content 120

Models trained on XML data 124

XML-trained Text Detection Model 128

XML-trained Bounding Box Direction Classification Model 130

XML-trained Text Recognition Model 132

XML-trained Word Splitter Model 134

XML Text File Generator 126

XML Text File 122

RUNTIME ENVIRONMENT 104

Models trained on XML data 116

OCR data 110

Training Unit 108

OCR Models 114

XML Data Generation Unit 106

Font analyzer 112

TRAINING ENVIRONMENT 102

208 <note>
210 <to>Candace</to>
212 <from>Robert</from>
214 <heading>Reminder</heading>
216 <body>Our meeting is at 10:00 am tomorrow.</body>
218 </note>

206

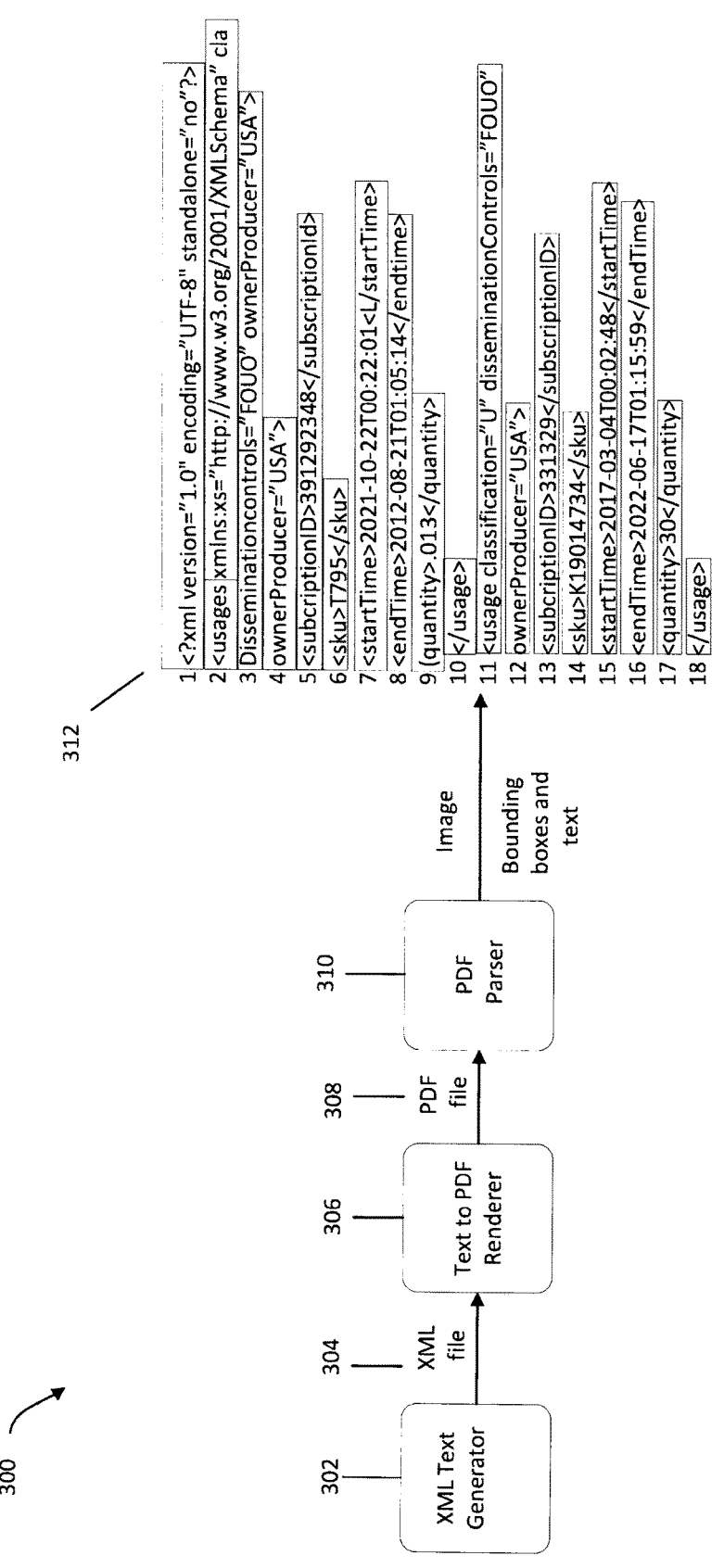

300

302   XML Text Generator

304   XML file

306   Text to PDF Renderer

308   PDF file

310   PDF Parser

Image

Bounding boxes and text

312

```
1 <?xml version="1.0" encoding="UTF-8" standalone="no"?>
2 <usages xmlns:xs="http://www.w3.org/2001/XMLSchema" cia
3 Disseminationcontrols="FOUO" ownerProducer="USA">
4 ownerProducer="USA">
5 <subcriptionID>391292348</subscriptionId>
6 <sku>T795</sku>
7 <startTime>2021-10-22T00:22:01<L/startTime>
8 <endTime>2012-08-21T01:05:14</endtime>
9 (quantity>.013</quantity>
10 </usage>
11 <usage classification="U" disseminationControls="FOUO"
12 ownerProducer="USA">
13 <subcriptionID>331329</subscriptionID>
14 <sku>K19014734</sku>
15 <startTime>2017-03-04T00:02:48</startTime>
16 <endTime>2022-06-17T01:15:59</endTime>
17 <quantity>30</quantity>
18 </usage>
```

Secure Facility 902

804

XML file

806

Printed XML file

808

Printed XML file

810

XML image

XML-trained OCR Model

812

XML file

814

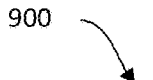

900

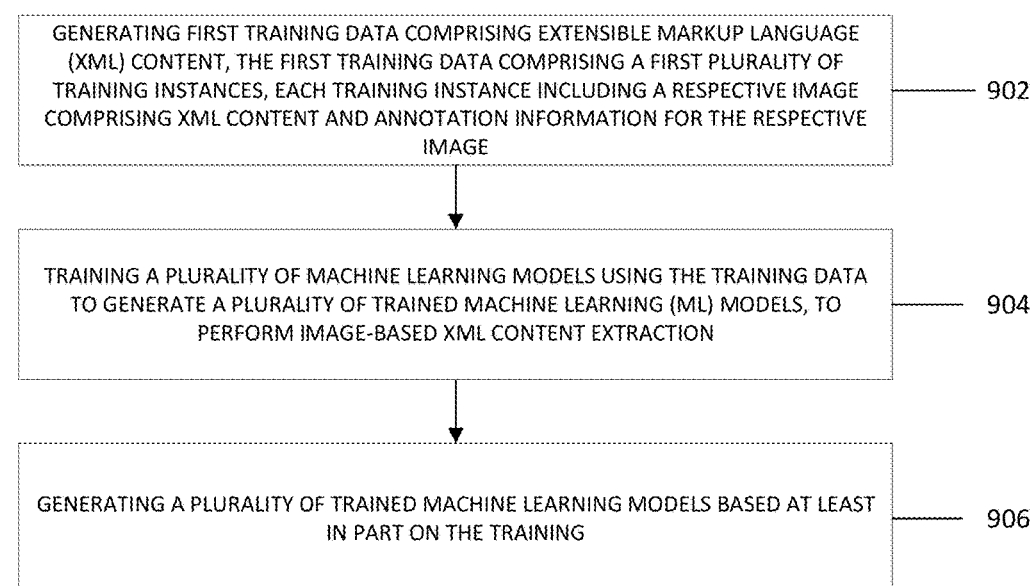

GENERATING FIRST TRAINING DATA COMPRISING EXTENSIBLE MARKUP LANGUAGE (XML) CONTENT, THE FIRST TRAINING DATA COMPRISING A FIRST PLURALITY OF TRAINING INSTANCES, EACH TRAINING INSTANCE INCLUDING A RESPECTIVE IMAGE COMPRISING XML CONTENT AND ANNOTATION INFORMATION FOR THE RESPECTIVE IMAGE ———— 902

TRAINING A PLURALITY OF MACHINE LEARNING MODELS USING THE TRAINING DATA TO GENERATE A PLURALITY OF TRAINED MACHINE LEARNING (ML) MODELS, TO PERFORM IMAGE-BASED XML CONTENT EXTRACTION ———— 904

GENERATING A PLURALITY OF TRAINED MACHINE LEARNING MODELS BASED AT LEAST IN PART ON THE TRAINING ———— 906

FIG. 9

1000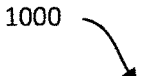

RECEIVING  A FIRST TRAINING DATA COMPRISING A PLURALITY OF TRAINING INSTANCES, THE PLURALITY OF TRAINING INSTANCES COMPRISING MULTIPLE SUBSETS OF TRAINING INSTANCES, EACH SUBSET COMPRISING A PLURALITY OF IMAGES, EACH IMAGE OF A SUBSET COMPRISING XML CONTENT IN A RESPECTIVE CANDIDATE FONT —— 1002

TRAINING A PLURALITY OF MACHINE LEARNING MODELS USING A PORTION THE PLURALITY OF TRAINING INSTANCES —— 1004

VALIDATING THE PLURALITY OF MACHINE LEARNING MODELS USING A BALANCE OF THE PLURALITY OF TRAINING INSTANCES —— 1006

DETERMINING A FONT OF THE SUBSET ASSOCIATED WITH A HIGHEST PERFORMANCE METRIC VALUE BASED ON THE VALIDATION OF THE PLURALITY OF MACHINE LEARNING MODELS —— 1008

GENERATING A SECOND TRAINING DATA COMPRISING A PLURALITY OF TRAINING INSTANCES, EACH TRAINING INSTANCE OF THE PLURALITY OF TRAINING INSTANCES COMPRISING XML CONTENT IN THE DETERMINED FONT —— 1010

TRAINING THE VALIDATED PLURALITY OF MACHINE LEARNING MODELS USING THE SECOND TRAINING DATA —— 1012

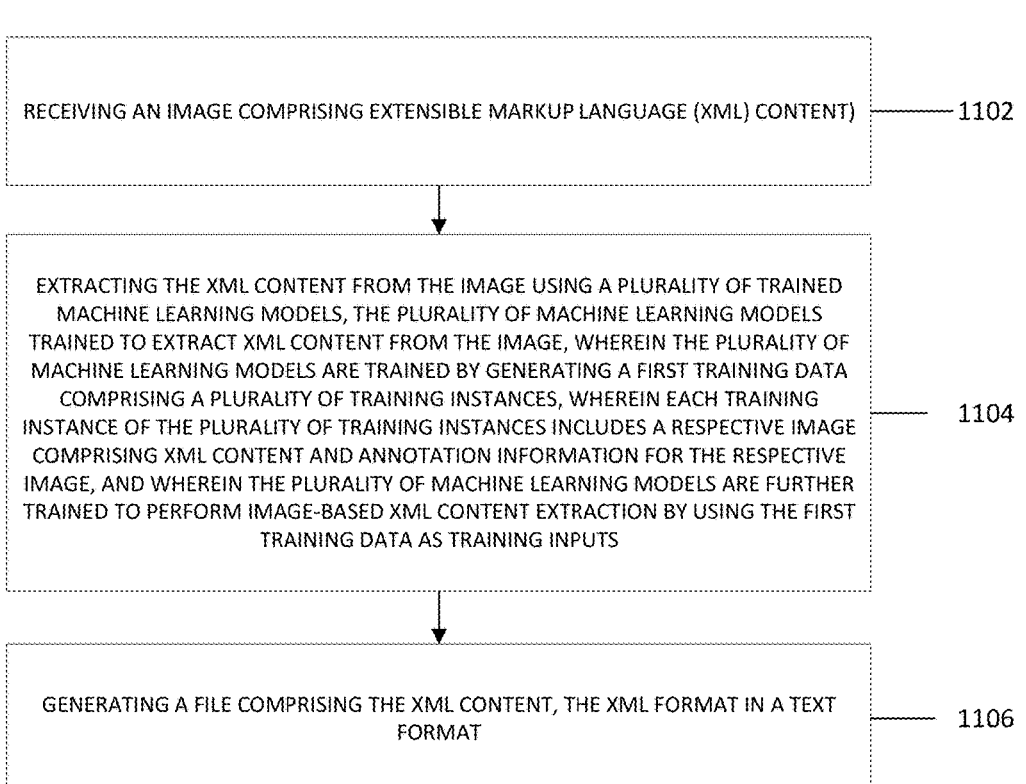

RECEIVING AN IMAGE COMPRISING EXTENSIBLE MARKUP LANGUAGE (XML) CONTENT) —— 1102

EXTRACTING THE XML CONTENT FROM THE IMAGE USING A PLURALITY OF TRAINED MACHINE LEARNING MODELS, THE PLURALITY OF MACHINE LEARNING MODELS TRAINED TO EXTRACT XML CONTENT FROM THE IMAGE, WHEREIN THE PLURALITY OF MACHINE LEARNING MODELS ARE TRAINED BY GENERATING A FIRST TRAINING DATA COMPRISING A PLURALITY OF TRAINING INSTANCES, WHEREIN EACH TRAINING INSTANCE OF THE PLURALITY OF TRAINING INSTANCES INCLUDES A RESPECTIVE IMAGE COMPRISING XML CONTENT AND ANNOTATION INFORMATION FOR THE RESPECTIVE IMAGE, AND WHEREIN THE PLURALITY OF MACHINE LEARNING MODELS ARE FURTHER TRAINED TO PERFORM IMAGE-BASED XML CONTENT EXTRACTION BY USING THE FIRST TRAINING DATA AS TRAINING INPUTS —— 1104

GENERATING A FILE COMPRISING THE XML CONTENT, THE XML FORMAT IN A TEXT FORMAT —— 1106

FIG. 11

SYNTHETIC DATA FINE-TUNED OPTICAL CHARACTER RECOGNITION ENGINE FOR EXTENSIBLE MARKUP LANGUAGE DOCUMENT RECONSTRUCTION

BACKGROUND

A cloud service provider (CSP) can provide multiple cloud services to subscribing customers. These services are provided under different models, including a Software-as-a-Service (SaaS) model, a Platform-as-a-Service (PaaS) model, an Infrastructure-as-a-Service (IaaS) model, and others. In many instances, a cloud services provider can offer on-demand services.

BRIEF SUMMARY

Embodiments described herein are directed toward optical character recognition for extensible markup language (XML) reconstruction. One embodiment includes a method for extensible markup language (XML) reconstruction. The method includes a computing system generating a first training data comprising extensible markup language (XML) content, the first training data comprising a first plurality of training instances, each training instance including a respective image comprising XML content and annotation information for the respective image.

The method further includes the computing system training a plurality of machine learning models using the first training data to generate a plurality of trained machine learning models, to perform image-based XML content extraction.

The method further includes the computing system generating a plurality of trained machine learning models based at least in part on the training.

Embodiments can further include a computing system, including a processor and a computer-readable medium including instructions that, when executed by the processor, can cause the processor to perform operations including generating a first training data comprising extensible markup language (XML) content, the first training data comprising a first plurality of training instances, each training instance including a respective image comprising XML content and annotation information for the respective image.

The instructions that, when executed by the processor, can further cause the processor to perform operations including training a plurality of machine learning models using the first training data to generate a plurality of trained machine learning models, to perform image-based XML content extraction.

The instructions that, when executed by the processor, can further cause the processor to perform operations including generating a plurality of trained machine learning models based at least in part on the training.

Embodiments can further include a non-transitory computer-readable medium including stored thereon instructions that, when executed by a processor, causes the processor to perform operations including generating a first training data comprising extensible markup language (XML) content, the first training data comprising a first plurality of training instances, each training instance including a respective image comprising XML content and annotation information for the respective image.

The instructions that, when executed by the processor, can further cause the processor to perform operations including training a plurality of machine learning models using the first training data to generate a plurality of trained machine learning models, to perform image-based XML content extraction.

The instructions that, when executed by the processor, can further cause the processor to perform operations including generating a plurality of trained machine learning models based at least in part on the training.

BRIEF DESCRIPTION OF THE DRAWINGS

FIG. 1 is an illustration of a system for fine-tuning an OCR model using synthetic extensible markup language (XML) documents, according to one or more embodiments.

FIG. 3 is an illustration for generation of an XML document, according to one or more embodiments.

FIG. 9 is a process flow for training a machine learning model for XML content extraction, according to one or more embodiments.

FIG. 10 is a process flow for identifying an optimal font for training a machine learning model for XML content extraction, according to one or more embodiments.

FIG. 11 is a process flow for extracting XML content from an image, according to one or more embodiments.

DETAILED DESCRIPTION

Figure 2:
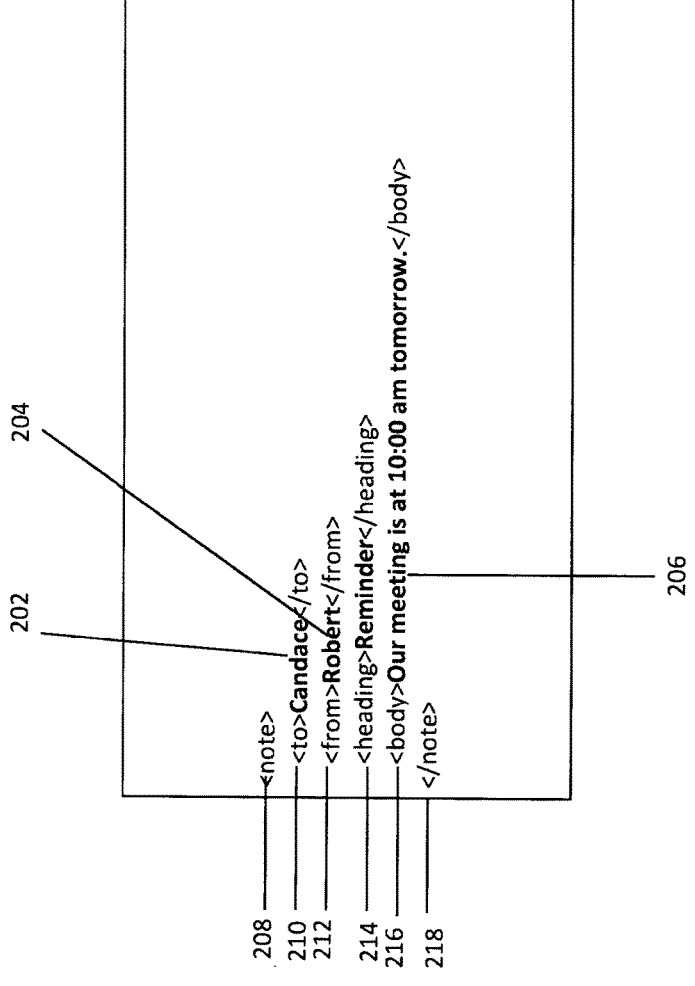
FIG. 2 is an illustration of an XML document image, according to one or more embodiments.

In the following description, various embodiments will be described. For purposes of explanation, specific configurations and details are set forth to provide a thorough understanding of the embodiments. However, it will also be apparent to one skilled in the art that the embodiments may be practiced without the specific details. Furthermore, well-known features may be omitted or simplified in order not to obscure the embodiment being described.

Optical character recognition (OCR) can involve a process of converting a digital document or image into machine-readable text. In general, the OCR process can include a computing system taking a text image as an input, and then identifying the text. The OCR process of detecting and recognizing text can be important for many document analysis applications. Some cloud computing providers (CSPs) offer OCR engines/services that convert human-oriented documents (e.g., receipts, invoices or other documents that are to be read by a human) to machine-readable text. A cloud services customer can provide the cloud computing provider with documents for conversion into a desired digital format. The cloud computing provider can include infrastructure that includes an OCR service for converting the documents into a desired digital format.

In some instances, a CSP customer may need to use an OCR service for some computer-orientated documents, such as extensible markup language (XML) documents. For example, a use case can include transferring important business information (e.g., billing data) in and out of a network-restricted place (e.g., a government building). In some instances, a document may need to be taken from a secure location, such as a government building. The government building may further be subject to security protocols that restrict electronic communication to and from the government building. For example, the security protocols may only allow physical documents to be transmitted to and from the building. Therefore, if a user wants to take a document with text outside of the building, that user will need to print out a physical copy of the document and take the physical document rather than transmit an electronic file over a network. To convert the physical document back into an electronic file, the user will need to scan the document to create an image. The user can then use an OCR service to convert the image into an electronic file that includes machine-readable text.

One issue is that existing OCR services are designed for human-orientated documents, which are to be read by a human. However, XML documents can contain many special characters and markup patterns that do not follow natural English grammar. As a result, existing OCR services use models that do not accurately convert XML content included in a physical document into machine-readable text. Furthermore, a model used by an OCR service for reconstructing XML documents needs to be almost 100% accurate. Otherwise, the reconstructed XML document may not be in a valid format to be processed by a computing system, or contain mistakes in important information (e.g., billing date). For example, existing OCR services can misidentify characters and incorrectly determine a writing direction of an XML line. As a result, the OCR service can misidentify and transpose the characters when converting the physical document into machine-readable text. For example, an OCR service can read a physical document that includes a string of text such as, "<body>34560. </body>", in XML and misidentify characters and incorrectly determine a writing direction. For example, the OCR service can misidentify "0" for "o" and generate machine-readable text that reads "<body>3456o.</body>." The OCR service can also incorrectly determine the writing direction and generate machine-readable text that reads "<body>06543.</body>." In some instances, the issues are compounded, and the OCR service can both misidentify characters and incorrectly determine the writing direction, such that the OCR service generates machine-readable text that reads "<body>06543.</body>." This can create issues that are proportional to the importance of the information. For example, if this were a passcode to an important system, then an authorized user may not be able to perform their duties, if they could not input a valid passcode.

Embodiments described herein address the above-described issues by introducing a fine-tuned OCR model that can recreate an XML file from a physical document or digital image. The fine-tuned OCR model can include a set of machine learning models that each perform a task. For example, the fine-tuned OCR model can include a text detection model for detecting lines of text and generating bounding boxes that include the text lines. The fine-tuned OCR model can further include a bounding box direction classification model for determining an alignment of the text in each bounding box and correcting a misalignment of the text. The fine-tuned OCR model can further include a text recognition model for predicting the text content in the bounding boxes as a sequence of characters. The fine-tuned OCR model can further include a word splitter model for detecting individual words within bounding boxes.

To fine-tune an OCR model for XML recognition, a computing system can create XML data that includes customized data patterns. The XML data can be used to generate input data for a computing system configured to train an OCR model. The computing system can receive an OCR model from a database, as well as OCR data from another database. The OCR model can be configured to convert images of handwritten or printed text into a machine-readable text. The OCR model may not necessarily be configured to convert an image of XML content into machine-readable text. The OCR data can be ground truth data that can include target predictions that the computing system can use to compare against predictions made using the OCR model being trained has made during training. Once the OCR model is fine-tuned, the model can be deployed for use by a cloud computing service. A customer can provide the fine-tuned OCR model with an input generated from a physical document of a digital image that includes XML content. The fine-tuned OCR model can recognize data patterns in the XML content and generate machine-readable text that recreates the original XML content.

FIG. 1 is an illustration 100 fine-tuning an OCR model using synthetic XML documents, according to one or more embodiments. The illustration 100 includes a training environment 102 describing the training of the machine learning models for XML content extraction. The illustration 100 further includes a runtime environment 104 for executing the machine learning models to extract XML content from an image.

The training environment 102 can include an XML data generation unit 106, a training unit 108, OCR data 110, a font analyzer 112, and OCR models 114. The XML data generation unit 106 can generate synthetic XML data and transmit the data to the training unit 108. The training unit 108 can further receive OCR data 110 and an OCR model from the OCR models 114. The training unit 108 can use the synthetic XML data and the OCR data to fine-tune the OCR models 114 to generate models trained on XML data 116. During the training process, the XML data generation unit 106 can generate different subsets of XML training data instances. Each subset can include XML content in a respective font. For example, the XML data generation unit 106 can generate one subset with XML content in Times New Roman, and another subset with XML content in Calibri. The training unit 108 can evaluate the performance each model based on a particular font. The training unit 108 can further indicate which font resulted in the highest performing machine learning models.

It should be appreciated that in addition to the illustrated system components, additional system components can be included to perform one or more of the tasks described herein. For example, the XML data generation unit 106 can create an XML file and send the file to a text-to-PDF renderer to render a PDF file. The PDF renderer can transmit the rendered PDF image to a PDF parser can modify the PDF image to include bounding boxes for identifying particular sections in the PDF image. The PDF parser can transmit the modified PDF image to the training unit for fine-tuning an OCR model.

The XML data generation unit 106 can be configured to generate synthetic XML content. The XML data generation unit 106 can generate XML content in the form of XML content. The XML content can include plain text, which is the data that is to be stored and transmitted, and tags, which indicate the structure and data type of the plain text. An example XML content is provided with respect to FIG. 2. In some instances, the XML tags are arranged in a particular position based on a data pattern. In other instances, the XML tags are randomly arranged in the XML content.

In some instances, a CSP can receive special requests from a customer, including for customized data patterns for special use cases. The CSP can configure the XML data generation unit 106 to generate XML documents that include these data patterns. The data patterns can include plain text that is structured in a particular manner to match a use case. For example, the customer can request that the lines of XML content are spaced in a particular manner, include desired XML tags, or include XML content to resemble a particular document (e.g., invoice, tax form, list). In some embodiments, the XML tags can be randomly arranged in the XML content. Examples of different XML document image patterns that can be requested by a customer are provided in the Figures.

The XML file generated by the XML data generation unit 106 can be rendered into a portable document format (PDF) file. The file can include a description of the XML content and structure that can be used to recreate the content. For example, the PDF file can include an indication of text, font, and structure. This rendering from the XML file to the PDF file is to mimic printing the XML content from a digital format and onto a physical piece of paper. The XML data generation unit 106 can be configured to render the XML content in any available font and font size. In some instances, the font and font size are selected by a user to maximize an OCR model's accuracy.

The PDF file can be parsed into images that include corresponding word and line annotations, including text annotations and bounding box annotations. Each bounding box can be a rectangle that surrounds a portion of the XML content. The bounding box can be used to indicate a position of the content on the document and a class of the content surrounded by the bounding box. Each bounding box can be used by the training unit 108 to identify the position and class of different portions of the XML content. The parsed PDF file can be transmitted to the training unit 108 to train a machine learning model for XML content extraction.

In addition to the parsed PDF file, the training unit 108 can receive an OCR model that is to be fine-tuned for the XML content extraction. Fine-tuning can be a process of taking a neural network that has been trained for one task and adjusting the network to perform a related task. As described herein, fine-tuning can include taking a neural network and training the neural network for XML content extraction. For example, a neural network can include pretrained weights (e.g., a fit OCR model). The fit OCR model can be configured for character recognition, however, not specifically for characters found in XML documents.

The training unit 108 can use the pretrained weights as initial weights and adjust the weights to train the OCR model for XML content extraction.

In some embodiments, the OCR models 114 includes a set of machine learning models that are to be used for XML content extraction. For example, an OCR model can include a text detection model, a bounding box direction classification model, a text recognition model, and word splitter model. Each model can be configured to perform a specific task to analyze the rendered PDF file to recreate the original XML content. For example, the text detection model can be configured to detect the bounding boxes that include text lines from the rendered PDF. The bounding box direction classification model can determine if a line of text has been incorrectly rotated and correct any incorrectly rotated text. The text recognition model can be configured to characters in a line of text. The word splitter model can detect individual words in a line of text. Each of these models can be fine-tuned for XML content extraction.

As indicated above, the XML data generation unit 106 can generate training instances that include XML content in different fonts. The XML data generation unit 106 can generate training data that includes subsets of training instances, in which each subset includes XML content in a different font. The XML data generation unit 106 can select the fonts from a universe of fonts or from a predetermined set of fonts. For example, one subset of training instances incudes XML content in Cambria and another subset of training instances includes XML content in Arial Narrow. A training instance can include XML content in a single font. In other words, all of the XML content is in a single font for each training instance of the subset of training instances. In this way the accuracy of a machine learning model can be evaluated based on different fonts. The training instances can include randomized values. For example, a first training instance can include an XML tag with a first randomized value in a first location relative to the other content in the first xml document. A second training instance can include an XML tag with a second randomized value in a second location relative to the other content in the second xml document. The the first location can be different from the second location and the first randomized value can be different than the second randomized value.

The XML data generation unit 106 can determine a plurality of XML tag pairs in each training instance. Each XML tag pair can be randomly arranged in the XML content or arranged in a particular position based at least in part on the data pattern. Each respective XML value can be a randomly generated XML value or a desired XML value based at least in part on the data pattern.

The training unit 108 can evaluate the accuracy of the models based on different metric values. As each subset of training instances includes XML content in a respective font, the training unit 108 can evaluate the accuracy of the models based on a particular font. For example, the training unit 108 can receive a first subset of training instances that include XML content in a first font. The training unit 108 can additionally receive a second subset of training instances in a second font. The training unit 108 can train a first instance of the models using the first subset of training instances and measure the accuracy of the models based on one or more metrics. The training unit 108 can then train a second instance of the models using the second subset of training instances and measure the accuracy of the models based on the one or more metrics.

The training unit 108 can then transmit the results to the font analyzer 112. The font analyzer 112 can compare the accuracy of the models trained using the first subset of training instances to the accuracy of the models trained using the second subset of training instances. Based on the comparison, the font analyzer 112 can determine which font resulted in more accurately trained models. In some instances, the font analyzer 112 determines the font corresponding to the most accurate models. In other instances, the font analyzer 112 determines multiple fonts that corresponding to the k-most accurate models.

The font analyzer 112 can then transmit a signal describing one or more fonts identities to the XML data generation unit 106. In some instances, the XML data generation unit 106 can receive a signal based on the user's selection to generate XML content in the one or more identified fonts. In response, the XML data generation unit 106 can generate training instances that include XML content in the one or more fonts identified by the font analyzer 112 or the signal. The training unit 108 can then train a third instance of the models using training instances with XML content in the one or more identified fonts. In the instance that a customer requests the CSP to perform an XML content extraction, the CSP can suggest to the customer, that the customer provide the documents with XML content in the one or more identified fonts. The customer can then choose whether to provide the documents with XML content in the one or more identified fonts. As described below, the CSP can receive the documents and use the trained model, regardless of whether the XML content is in the one or more identified fonts and perform XML content extraction.

The runtime environment 104 includes an XML content extractor 118 that is operable to receive an image with XML content 120 and output an XML text file 122. The XML content extractor 118 can include models trained on XML data 124 and an XML text file generator 126. The models trained on XML data 124 can be the same as the models trained on XML data 116 and can include an XML-trained text detection model 128, an XML-trained bounding box direction classification model 130, an XML-trained text recognition model 132, and an XML-trained word splitter.

The image with XML content 120 can be received from a CSP customer and include XML content. The XML content can be in the one or more identified fonts or in another font. Based on the font analyzer 112 analysis, if the XML content is in the one or more identified fonts, the models can be expected to be more accurate than if the XML content is in another font.

The XML-trained text detection model 128 can receive the image with XML content and analyze the XML content to identity the position of individual lines of lines of text. For example, referring to FIG. 4, the document image 408 includes eleven lines of text. The XML-trained text detection model 128 can identify each line of text and generate a respective line bounding box for each line. The line bounding boxes can indicate a position of each line of text in the image.

The XML-trained bounding box direction classification model 130 can receive an output from the XML-trained text detection model 128 and determine whether the orientation of the text is correct. The XML-trained bounding box direction classification model 130 can determine whether the text in each bounding box is oriented correctly or incorrectly. For example, the XML-trained bounding box direction classification model 130 can determine whether the text is aligned correctly or has the text in a bounding box been misaligned. In the event that the XML-trained bounding box direction classification model 130 determines that the text has been misaligned, the XML-trained bounding box direction classification model 130 can rotate the text for proper alignment.

The XML-trained bounding box direction classification model 130 can transmit an output to the XML-trained text recognition model 132 and to the XML-trained word splitter model 134. The XML-trained text recognition model 132 can work in parallel with the XML-trained word splitter model 134 to process the output of the XML-trained bounding box direction classification model 130. The XML-trained text recognition model 132 can identify the individual text characters from each line of the XML content. The XML-trained word splitter model 134 can determine individual words within each line of text.

The XML-trained text recognition model 132 and the XML-trained word splitter model can transmit outputs to the XML text file generator 126. The output can include the positioning of the text lines determined by the XML-trained text detection model 128, the alignment of the text in the line bounding boxes identified by the XML-trained bounding box direction classification model, the text characters identified by the XML-trained text recognition model 132, and the words identified by the XML-trained word splitter model 134. Using this information, the XML text file generator 126 can generate an XML text file 122 with editable XML content. The positioning of the XML content in the XML text file 122 can mirror the positioning of the XML content in the image with XML content 120 such that the XML text file is a reconstruction of the image.

FIG. 2 is an illustration of an XML document image 200, according to one or more embodiments. The XML content can include an opening tag, plain text, and a closing tag. The tags can indicate how an XML document is to be structured or provide metadata functions. The plain text can be the data that is structured, stored, and transmitted. For the purposes of illustration, the plain text included in FIG. 2 is bolded to distinguish the plain text from the tags.

In FIG. 2, the plain text includes the names of a message sender 202, "Candace", a message recipient 204, "Robert", and a message 206, "Our meeting is at 10:00 am tomorrow." The XML document image 200 further includes tags that indicate a data type. As illustrated, FIG. 2 includes XML tags that can be called elements. The elements can be hierarchical elements, in that one element can include another element. A topmost element can be considered a root element 208 and the elements below the root element can be considered child elements. As illustrated, the root element ("note") 208, 218 indicates that the XML document image 200 is of a note. The child elements can include a "to" element 210 indicating the sender of the note, and a "from" element 212 indicating a recipient of the note, a "heading" element 214 indicating a note heading, and a "body" element 216 indicating a message included in the note.

FIG. 3 is an illustration 300 of a flow for generation of an XML document, according to one or more embodiments. A user can generate control instructions to cause an XML text generator 302 to generate an XML file 304. The XML file 304 can include text written in a syntax that is readable by a human and a computing system. The XML file 304 can use a system of tags to define a structure of the file. In some instances, a user can include a data pattern in the control instructions for the XML text generator 302 to follow while generating the XML file 304. For example, the user can include a data pattern to cause the XML text generator 302 to generate a text that includes the patterns. For example, the XML text generator 302 can receive control instructions that include a desired data pattern. The desired data patterns can include, for example, special characters and irregular grammar. In some instances, the data pattern includes randomizes values.

In addition to the data pattern, the user can transmit control instructions to the XML text generator 302 that includes a desired font. An XML document printed onto physical paper can be printed in any desired font, and the herein described system can also generate XML text in any font. In some instances, an accuracy of an OCR model can be increased or decreased based on the font selection. Therefore, in some instances, the user can transmit control instructions to generate the XML file in a font that maximizes the accuracy of the OCR model.

The XML text generator 302 can transmit the XML file 304 to a text-to-PDF renderer 306. The text-to-PDF renderer 306 can receive the XML file 304 and render a PDF document that includes a structure based on the tags included in the PDF. The text-to-PDF renderer 306 can further use a DOM API to read the tags included in the XML file and determine a structure for the XML file. It should be appreciated that rendering an XML file into a PDF is rendering the plain text and the tags on the XML content.

The text-to-PDF renderer 306 can transmit the PDF file 308 to the PDF parser 310. The PDF parser 310 (sometimes referred to as a PDF scraper) can be software that can be used to extract data elements (e.g., lines of text, paragraphs of text, images, tables, graphs, and single data fields) from the PDF file 308. In some instances, the PDF parser 310 includes a machine learning model that is trained to receive inputs generated from a PDF file and output an image that includes bounding boxes for individual elements of the PDF file.

The PDF file 308 can be loaded onto the PDF parser 310 for processing. Once the PDF file 308 has been loaded, the PDF parser 310 can convert the file into an array of pixels for image analysis. The PDF parser 310 can use a trained machine learning model to analyze the pixels and identify the different regions of the image and can begin to interact with the elements. In some instances, the original PDF document can include XML content that was generated in a standard format, and the machine learning model can be trained to recognize the regions based on that format. The PDF parser 310 can be configured to filter elements by class from each region, such as lines of text, images, single data fields. Once the elements have been filtered, the PDF parser 310 can extract the elements can create bounding boxes around desired elements.

As seen in FIG. 3, the PDF parser 310 has generated an output 312 that includes 18 lines of XML content. It can further be seen that the PDF parser 310 has generated bounding boxes around different sections of text. For example, there are eighteen bounding boxes that each surround a respective line of XML content. Each of the eighteen bounding boxes can serve as a reference point (e.g., ground truth) for object detection training. It should be appreciated that the PDF parser 310 can be trained to generate bounding boxes around different elements, and not necessarily lines of XML content. For example, the PDF parser can be trained, and user-configured to generate bounding boxes around paragraphs or individual words within a line of text.

The PDF parser 310 can transmit the output 312 to a training unit. The training unit can use the output along with OCR data to fine-tune an OCR model. As indicated above, the OCR model can be a collection of models, including a text detection model, a bounding box direction classification model, a text recognition model, and a word splitter model. Various steps can be taken to train an OCR model. For example, each of the training instances generated by the XML data generation unit can be standardized to include a standard format. The training instances can be analyzed to replace any incorrect data. The training instances can be augmented to increase the size of the training data set. As indicated above, in practice, customers can provide customized data patterns for their XML documents. Therefore, the training set distribution can be analyzed to ensure that a portion of the training data sets includes common or custom data patterns.

Once the training data has been finalized to be usable by an OCR model, an OCR technique can be selected. In some instances, this step can be performed before the training data has been finalized to make the training data more amenable for the selected technique. The OCR model's hyperparameters can be configured and tuned for optimal OCR performance on XML content. The OCR model results can be compared to OCR data and the model can be fine-tuned by adjusting the weights using backpropagation. During training, the features that generate the best results can be further identified, and the weights adjusted in accordance with these features.

Figure 4:
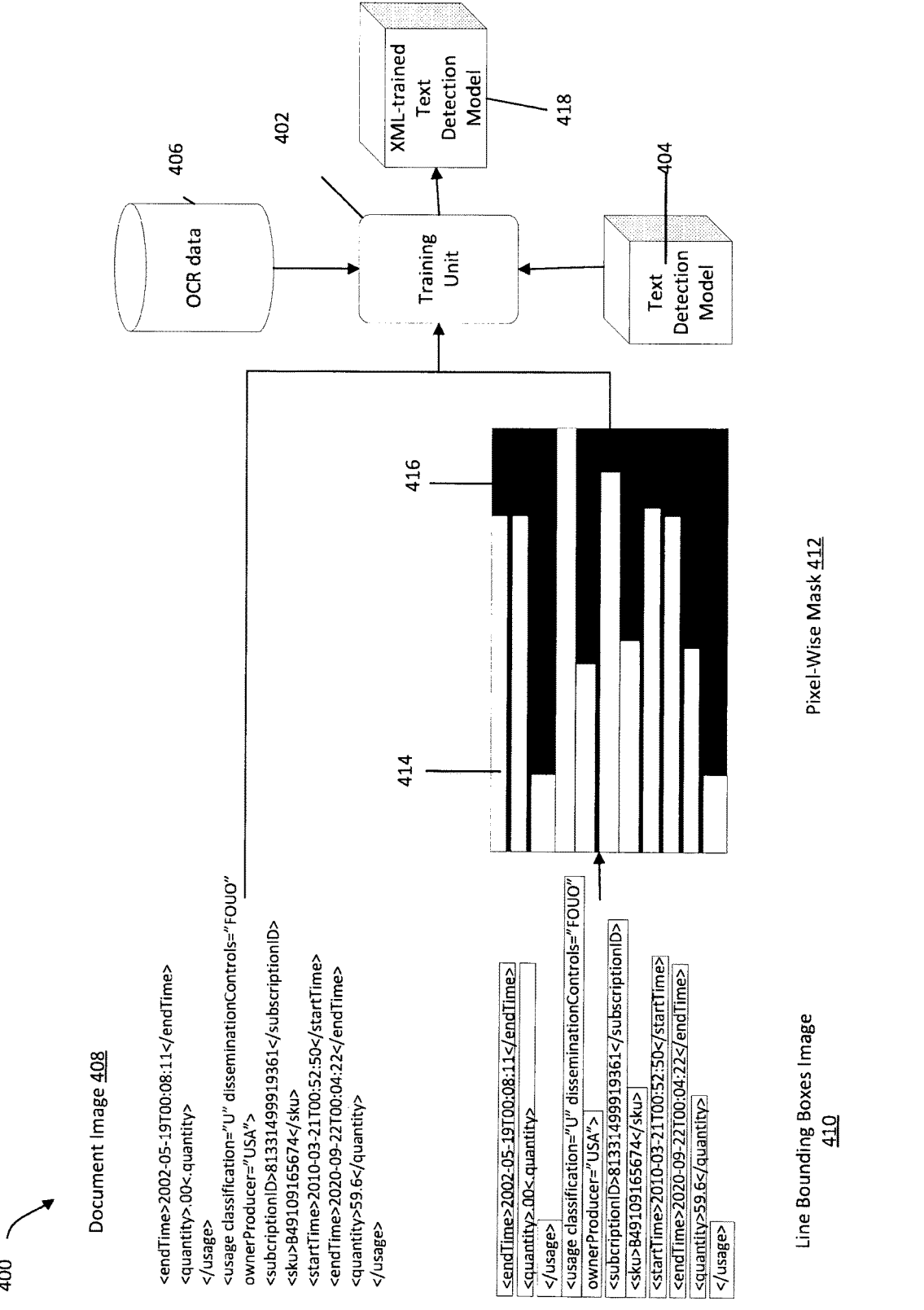
FIG. 4 is an illustration of fine-tuning a text detection model for XML content, according to one or more embodiments.

FIG. 4 is an illustration 400 of fine-tuning a text detection model for XML content, according to one or more embodiments. The training unit 402 can receive a text detection model 404 from an OCR model database. The training unit 402 can further receive OCR data 406 from an OCR database. The training unit 402 can further receive training data for training the text detection model 404 to process XML content. For example, the training unit 402 can receive a document image 408, which can include a PDF file that includes XML content. The training unit 402 can also receive ground truth data in the form of a line bounding boxes image 410 that includes bounding boxes around the lines text of the document image 408. The bounding boxes can be included in a pixel-wise mask 412, that is a two-dimensional image that is used to filter the document image to differentiate the text sections from the non-text sections. The pixel-wise mask 412 can include a coordinate system to match a coordinate system of the document image 408. As illustrated, the pixel-wise mask 412 includes a text section 414 (illustrated as a blank box) and a non-text section 416 (illustrated as black).

The training unit 402 can receive the document image 408 and the pixel-wise mask 412 and fine-tune the text detection model 404. Using the coordinate system to match the pixel-wise mask 412 to the document image 408, the training unit 402 can establish a ground truth as to the location of lines of text of the XML content in the document image 408. The training unit 402 can further fine-tune the text detection model 404 to be an XML trained segmentation-based test detector that can receive a document image-based input and output a pixel wise mask. The text detection model 404 can further be fine-tuned to generate a pixel-wise mask of bounding boxes to surround the lines of text.

For example, the training unit 402 can execute the text detection model 404 to make a prediction as to a pixel wise mask for the document image 408. The training unit 402 can further compare the prediction to the pixel-wise mask 412 generated by the PDF parser. Then based on a closeness of the predicted pixel-wise mask to the pixel-wise mask 412, the training unit 402 can use backpropagation to fine-tune the text detection model 404 to generate the fine-tuned text detection model 418.

Figure 5:
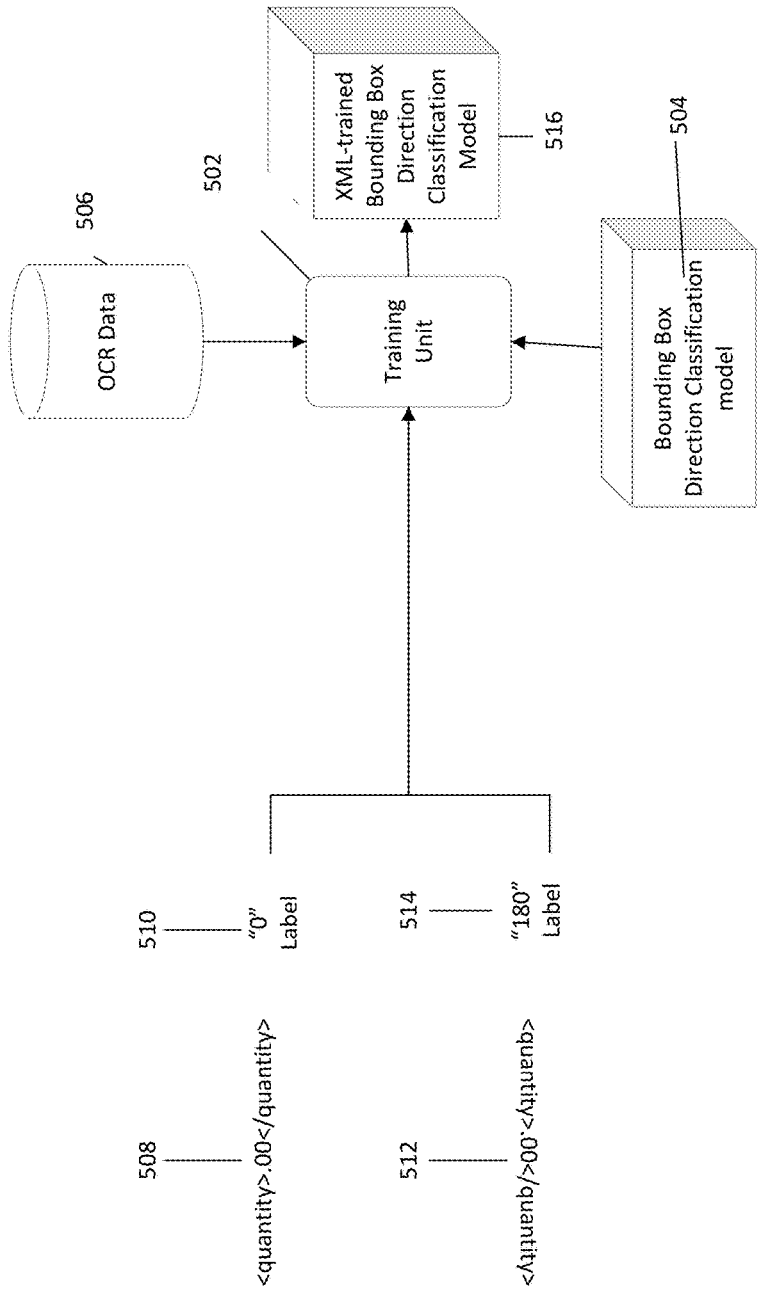
FIG. 5 is an illustration of fine-tuning a bounding box direction classification model for XML content, according to one or more embodiments.

FIG. 5 is an illustration 500 of fine-tuning a bounding box direction classification model for XML content, according to one or more embodiments. The training unit 502 can receive a bounding box direction classification model 504 from an OCR model database. The training unit 502 can further receive OCR data 506 from an OCR database. To fine-tune the bounding box direction classification model 504, the training unit 502 can receive a set of cropped lines of XML content. The lines can be cropped from, for example, a PDF file with bounding boxes surrounded text generated by a PDF parser. The cropped lines of text can further be labeled to indicate no rotation. For example, as illustrated, a cropped line of text 508 has a first label 510 of "0" as ground truth data. This is indicative that the cropped line has not been rotated. The cropped lines can also be duplicated and rotated 180 degrees. As illustrated, a rotated cropped line of text 508, is shown. The rotated cropped line of text further includes a second label 514 of "180", as ground truth data which is indicative of the cropped line being rotated 180 degrees. The training unit 502 can receive the cropped line of text 508, the first label 510, the rotated cropped line of text 512 and the second label 514.

The training unit 502 can use this received data to fine-tune the bounding box direction classification model 504 to recognize an orientation of XML content, and to correct the orientation is incorrect. For example, the training unit 502 can use training data with XML content as an input and execute the bounding box direction classification model 504 to predict whether a line text is oriented correctly or incorrectly. The training unit 502 can further use the cropped line of text 508, the first label 510, the rotated cropped line of text 512 and the second label 514 as ground truth data to evaluate the bounding box direction classification model 504. Based on a closeness of the predicted orientation and the actual orientation, the training unit 502 can fine-tune the bounding box direction classification model 504 by adjusting the weights through a backpropagation. The training unit 502 can continue to fine-tune the bounding box direction classification model 504 until it performs at an acceptable level. At this point, the training unit 502 can output a fine-tuned bounding box direction classification model 516.

Figure 6:
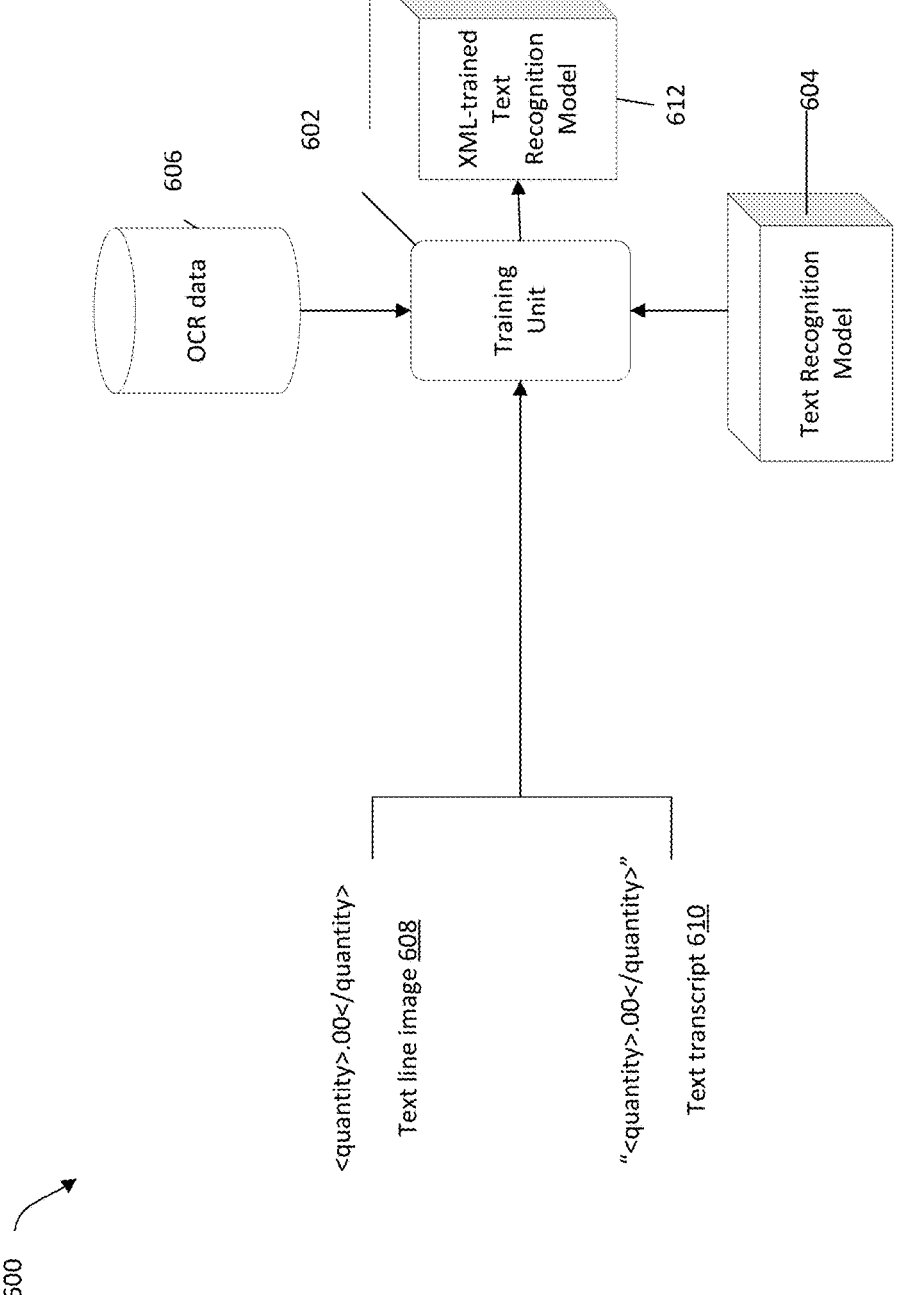
FIG. 6 is an illustration of fine-tuning a text recognition model for XML content, according to one or more embodiments.

FIG. 6 is an illustration 600 of fine-tuning a text recognition model for XML content, according to one or more embodiments. The training unit 602 can receive a text recognition model 604 from an OCR model database. The training unit 602 can further receive OCR data 606 from an OCR database. The training unit 602 can further receive a text line image paired with a ground truth text transcript. The text line image 608 can be a line cropped from a document image and include XML content. The text transcript 610 can be ground truth data to be used for fine-tuning the text recognition model 604.

As illustrated, the training unit 602 can receive a text line image 608 and a text transcript 610. Each of the text line image 608 and the text transcript 610 can read <quantity>0.00</quantity>, with the text line image 608 being a cropped out portion of a PDF image and the time transcript being a machine-readable ground truth data. The training unit 602 can use the text recognition model 604 to analyze the text line image and predict a sequence of characters in the XML content. The training unit 602 can further use the text transcript as ground truth to evaluate the predictions of the text recognition model. Based on a closeness of the predicted sequence of characters and the actual sequence of characters, the training unit 602 can fine-tune the text recognition model 604 by adjusting the weights through a backpropagation. For instance, the training unit 602 can evaluate how close the predicted sequence of characters is to <quantity>0.00</quantity>. The training unit 602 can continue to fine-tune the text recognition model 604 until it performs at an acceptable level. At this point, the training unit 602 can output a fine-tuned text recognition model 612.

Figure 7:
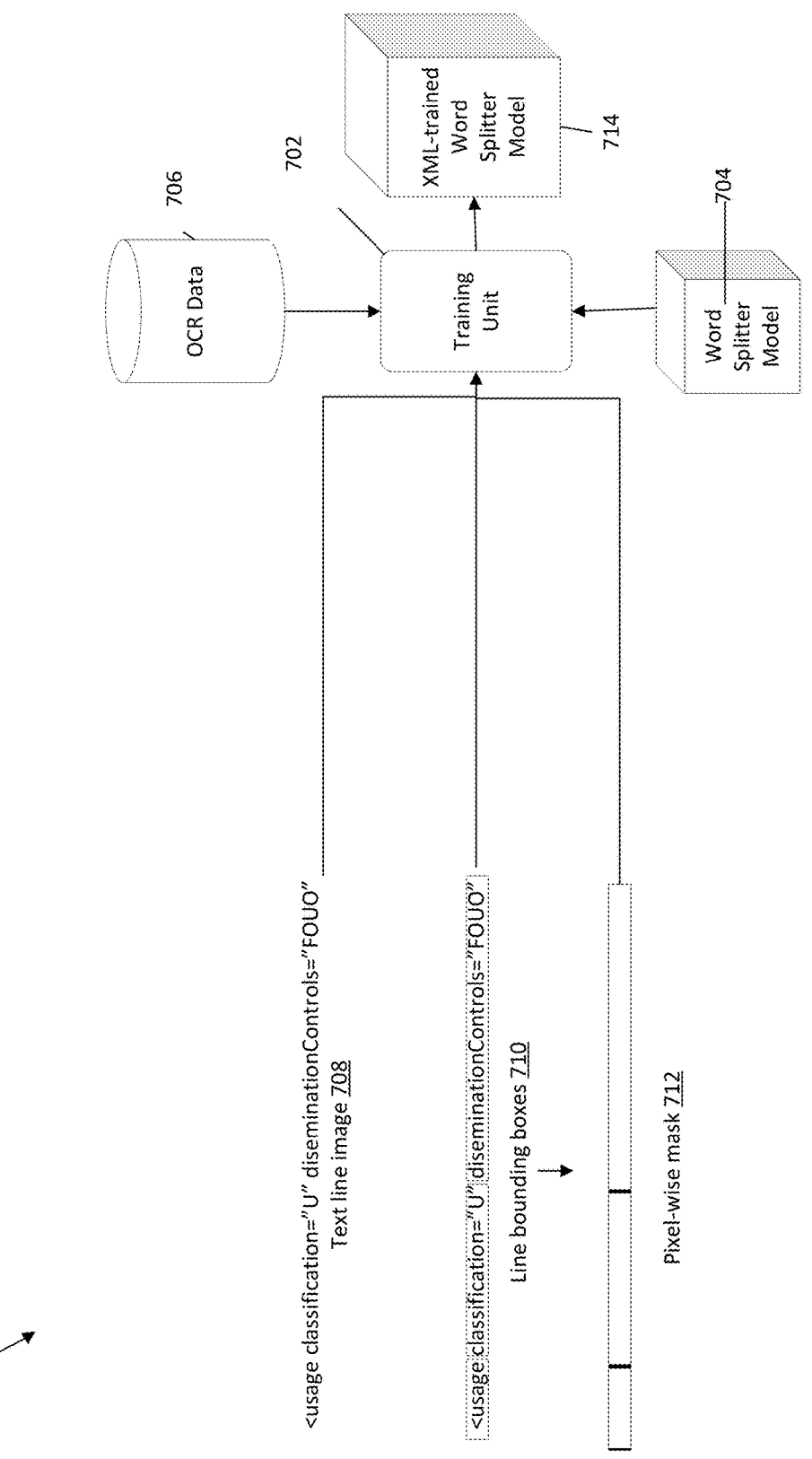
FIG. 7 is an illustration of fine-tuning a word splitter model for XML content, according to one or more embodiments.

FIG. 7 is an illustration 700 of fine-tuning a word splitter model for XML content, according to one or more embodiments. The training unit 702 can receive a word splitter model 704 from an OCR model database. The training unit 702 can further receive OCR data 706 from an OCR database. The training unit 702 can further receive a cropped text line image, a word-level bounding box as ground truth. The training unit 702 can further convert the word-level bounding box into a pixel-wise mask for fine-tuning the word splitter model 704. The training unit 702 can execute the word splitter model to predict identifications of words within a line of XML content. Words can be considered individual elements of a line of XML content.

As illustrated, the training unit 702 can receive a text line image 708. As illustrated, the text line image 708 reads <usage classification="U" disseminationControls="FUOU" and includes three words "<usage", "classification="U,"" and "disseminationControls="FUOU"." The training unit 702 can further receive word bounding boxes 710, which include bounding boxes for individual words rather than bounding boxes for wholes lines of text from a document image. As seen, the bounding boxes surround the words of the text line. The training unit 702 can further receive a pixel-wise mask 712 as ground truth data. As seen, the pixel-wise mask 712 includes a text section and a non-text section similar to the pixel-wise mask 412 of FIG. 4. As further seen, the text sections and non-text sections correspond to the bounding boxes that surround the words of the text line. The pixel-wise mask 712 can further include a coordinate system that corresponds to a coordinate system of the text line image.

The training unit 702 can execute the word splitter model 704 to cause it to identify individual word instances in a text line. The word splitter model 704 does not necessarily know the sequence of letters that form a word. Rather the word splitter model 704 can identify different word instances within a single text line. For example, the word splitter model 704 can identify two different word instances within a single text line based on, for example, spacing between characters, and other appropriate characteristics. However, the word splitter model may not recognize the sequence of characters that make up the words. For example, the word splitter model 704 can determine that there are three different word instances in the text line image 708 (e.g., "<usage", "classification="U"", and "disseminationControls="FOUO"," but may not recognize the actual words.

The training unit 702 can further use the pixel-wise mask 712 as ground truth to evaluate the predictions of the word splitter model 704. This can include using the coordinate system of the pixel-wise mask 712 to match the text sections and non-text section with the words in the text line image 708. Based on a closeness of the predicted words and the words, the training unit 702 can fine-tune the word splitter model 704 by adjusting the weights through backpropagation. The training unit 702 can continue to fine-tune the word splitter model 704 until it performs at an acceptable level. At this point, the training unit 702 can output a fine-tuned word splitter model 714.

Figure 8:
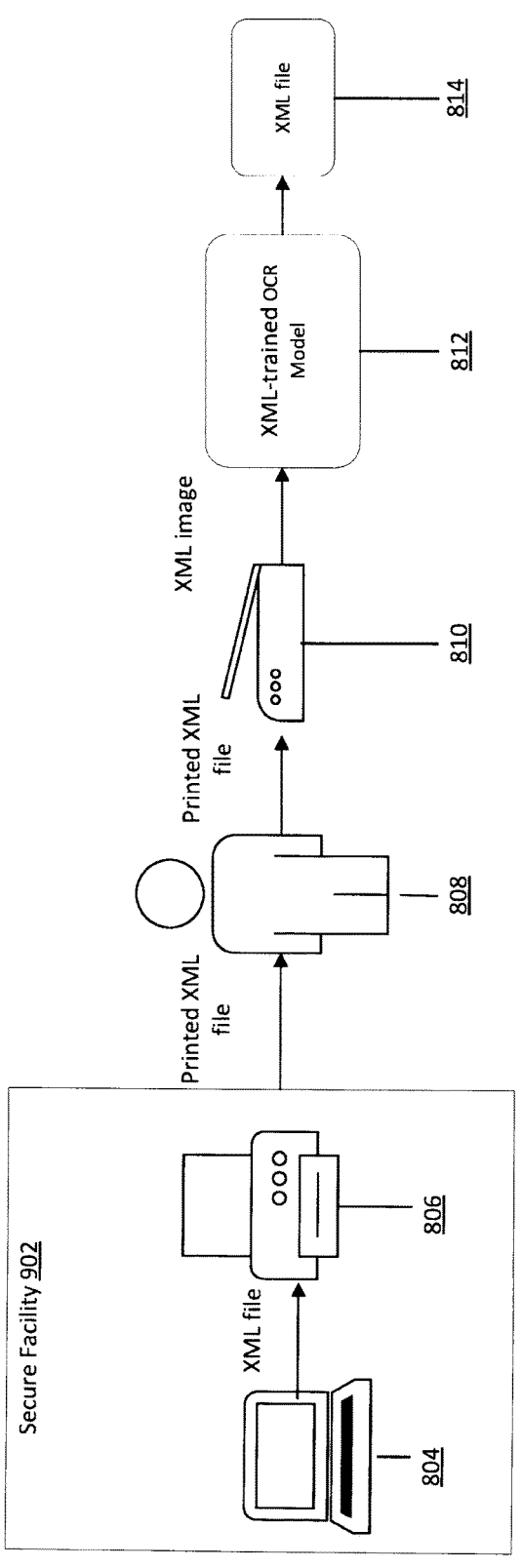
FIG. 8 is an illustration of an example use case, according to one or more embodiments.

FIG. 8 is an illustration 800 of an example use case, according to one or more embodiments. An XML file can be located in a secure facility 802 on a computing device 804. The secure facility 802 can prohibit the XML file from being electronically transmitted outside of the facility. A user can transmit the XML file from the computing device 804 to a printer 806 and print out the XML file on paper. A person 808 can take the printed out XML file to a scanner 810 and create an image of the XML file, such as a PDF image.

A fine-tuned OCR model 812 can be used to recreate the XML file, the fine-tuned OCR model 812 can include the fine-tuned text detection model, the fine-tuned bounding box direction classification model, the fine-tuned text recognition model, and the fine-tuned word splitter model. A PDF file including XML content can be received by the fine-tuned text detection model, which can generate bounding boxes to surround lines of XML content and generate a pixel-wise mask for the lines of XML content in the PDF image. The fine-tuned text detection model can transmit the PDF file, bounding boxes, and pixel-wise mask to the fine-tuned bounding box direction classification model. The fine-tuned bounding box direction classification model can determine whether each line of XML content is oriented in the correct direction. The fine-tuned bounding box direction classification model can further correct any line of text that has been incorrectly oriented. The fine-tuned bounding box direction classification model can transmit the document image, the bounding boxes, and pixel-wise mask to the fine-tuned text recognition model and the fine-tuned word splitter model that can each work in parallel. The fine-tuned text recognition model can predict a sequence of characters for each line of text. The fine-tuned word splitter model can assist the fine-tuned text recognition model by identifying individual words in each line of XML content. The fine-tuned OCR model can then generate machine-readable text that recreates the original XML file that was stored in the secure facility/

FIG. 9 is a process flow 900 for training a machine learning model for XML content extraction, according to one or more embodiments. At 902, the method can include a computing device generating a first training data comprising extensible markup language (XML) content, the first training data comprising a first plurality of training instances, each training instance including a respective image comprising XML content and annotation information for the respective image. The computing device can be a server hosting an OCR service for a cloud computing provider. The XML content can include written in an XML format including XML tags and plain text. The annotation information can include ground truth data to be used to train a machine learning model. The annotation information can include for example, a location of each line of text (e.g., a pixel-wise mask) and a description of the plain text.

At 904, the method can include the computing device training a plurality of machine learning models to perform image-based XML content extraction. The training can include generating multiple subsets of training instances that include XML content. For each subset of the multiple subsets of training instances the training can further include training the plurality of machine learning models using the subset. The plurality of machine learning models can include a text detection model, a text detection model configured to detect a line of text, a bounding box direction classification model configured to directionally align the line of text, a text recognition model configured to identify text characters in the line of text; and a word splitter model configured to identify words in the line of text. The computing system can validate the plurality of machine learning models using a portion of the first training data. The validation can include measuring a performance metric (e.g., accuracy) value for the plurality of machine learning models for the subset. The computing system can identify a particular font (e.g., Calibri, Arial) of the set of candidate fonts corresponding to a subset from the multiple subsets for which a highest performance metric value was measured for the plurality of machine learning models.

At 906, the method can include the computing system generating plurality of trained machine learning models based at least in part on the training. The trained models can be deployed for use by cloud service for XML content extraction.

FIG. 10 is a process flow 1000 for identifying an optimal font for training a machine learning model for XML content extraction, according to one or more embodiments. At 1002, the method can include receiving a first training data comprising a plurality of training instances. The plurality of training instances comprising multiple subsets of training instances. Each subset comprising a plurality of images, each image of a subset comprising XML content in a respective candidate font (e.g., Times New Roman, Arial).

At 1004, the method can include the computing system training a plurality of machine learning models using a portion of the plurality of training instances. The training can include using the portion of the plurality of training instances as inputs for a first iteration of the plurality of machine learning models. Each machine learning model can be tasked to perform a specific function for XML extraction. Together the machine learning models can form a pipeline for receiving an image that includes XML content and outputting an XML text file.

At 1006, the method can include the computing system validating the plurality of machine learning models using a balance of the plurality of training instances. The validation can include using a cost function to compare the output of the machine learning models to ground truth data. The cost function can be used to evaluate performance metric (e.g., accuracy) of each models. During the training process, the weights of the models can be adjusted to generate new iterations of the machine learning models. The training can continue until adjusting the weights no longer results in an appreciable improvement in the performance metric.

At 1008, the method can include the computing system determining a font of the subset associated with a highest performance metric value based on the validation of the plurality of machine learning models. The computing system can compare the outputs of the machine learning models based on a font of the inputted training instances. For example, one iteration of the machine learning models can be trained using training instances in one font. Another iteration of the machine learning models can be trained using training instances in another font. The computing system can compare the iterations based on the performance metric. The computing system can further identify the font of the training instances used to train the highest performing machine learning models.

At 1010, the method can include the computing system generating a second training data comprising a plurality of training instances, each training instance of the plurality of training instances comprising XML content in the determined font. In some instances, the identity of the determined font is sent to a user along with an indication that the font is associated with the highest performing machine learning models. The user can then select the determined font to be used to generate a second training data.

At 1012, the method can include the computing system training the validated plurality of machine learning models using the second training data. The second training data can include a plurality of training instances, each training instance including a respective image comprising XML content in the determined font and annotation information for the respective image. The training can include using the portion of the plurality of training instances as inputs for the validated machine learning models. Each validated machine learning model can be tasked to perform a specific function for XML content extraction. Together the machine learning models can form a pipeline for receiving an image that includes XML content and outputting an XML text file.

FIG. 11 is a process flow for extracting XML content from an image, according to one or more embodiments. At 1102 the method can include a computing system receiving an image comprising extensible markup language (XML) content. The image can be received by a cloud service provide customer can be an image converted from a PDF of a scanned document.

At 1104, the method can include the computing system extracting the XML content from the image using a plurality of trained machine learning models. The plurality of machine learning models can be trained to extract XML content from the image. The plurality of machine learning models can be generated using a first training data. The first training data can include a plurality of training instances. Each training instance of the plurality of training instances can include a respective image comprising XML content and annotation information for the respective image. The computing system can train the plurality of machine learning models using the first training data to generate the plurality of trained machine learning models that perform image-based XML content extraction.

At 1106, the method can include the computing system generating, using the plurality of trained machine learning models, a file comprising the XML content, the XML content in a text format. The XML content in the file can be editable by a user to modify, delete, or add additional XML content to the file.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 12:
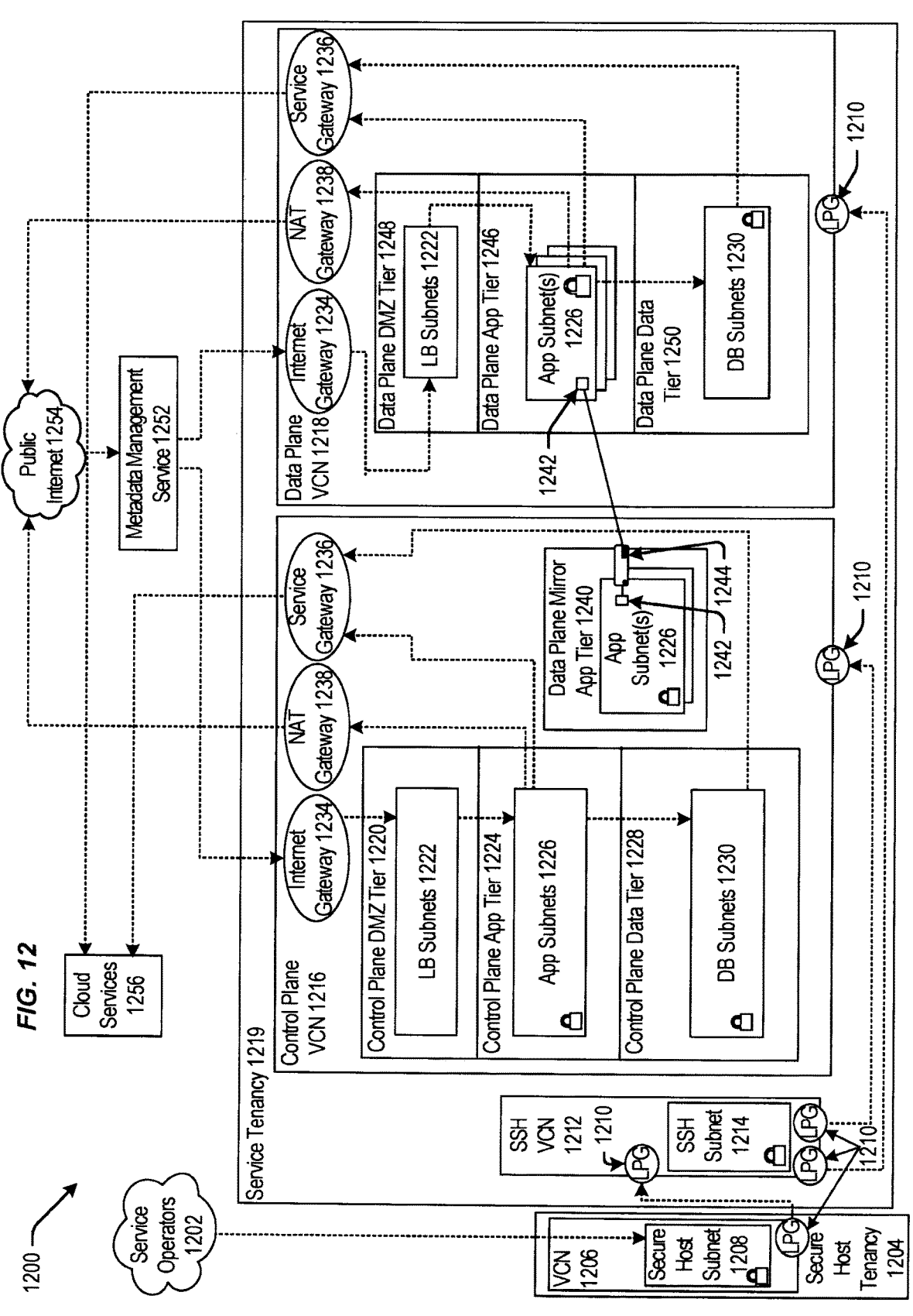
FIG. 12 is a block diagram illustrating one pattern for implementing a cloud infrastructure as a service system, according to one or more embodiments.

FIG. 12 is a block diagram 1200 illustrating an example pattern of an IaaS architecture, according to at least one embodiment. Service operators 1202 can be communicatively coupled to a secure host tenancy 1204 that can include a virtual cloud network (VCN) 1206 and a secure host subnet 1208. In some examples, the service operators 1202 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1206 and/or the Internet.

The VCN 1206 can include a local peering gateway (LPG) 1210 that can be communicatively coupled to a secure shell (SSH) VCN 1212 via an LPG 1210 contained in the SSH VCN 1212. The SSH VCN 1212 can include an SSH subnet 1214, and the SSH VCN 1212 can be communicatively coupled to a control plane VCN 1216 via the LPG 1210 contained in the control plane VCN 1216. Also, the SSH VCN 1212 can be communicatively coupled to a data plane VCN 1218 via an LPG 1210. The control plane VCN 1216 and the data plane VCN 1218 can be contained in a service tenancy 1219 that can be owned and/or operated by the IaaS provider.

The control plane VCN 1216 can include a control plane demilitarized zone (DMZ) tier 1220 that acts as a perimeter network (e.g., portions of a corporate network between the corporate intranet and external networks). The DMZ-based servers may have restricted responsibilities and help keep breaches contained. Additionally, the DMZ tier 1220 can include one or more load balancer (LB) subnet(s) 1222, a control plane app tier 1224 that can include app subnet(s) 1226, a control plane data tier 1228 that can include database (DB) subnet(s) 1230 (e.g., frontend DB subnet(s) and/or backend DB subnet(s)). The LB subnet(s) 1222 contained in the control plane DMZ tier 1220 can be communicatively coupled to the app subnet(s) 1226 contained in the control plane app tier 1224 and an Internet gateway 1234 that can be contained in the control plane VCN 1216, and the app subnet(s) 1226 can be communicatively coupled to the DB subnet(s) 1230 contained in the control plane data tier 1228 and a service gateway 1236 and a network address translation (NAT) gateway 1238. The control plane VCN 1216 can include the service gateway 1236 and the NAT gateway 1238.

The control plane VCN 1216 can include a data plane mirror app tier 1240 that can include app subnet(s) 1226. The app subnet(s) 1226 contained in the data plane mirror app tier 1240 can include a virtual network interface controller (VNIC) 1242 that can execute a compute instance 1244. The compute instance 1244 can communicatively couple the app subnet(s) 1226 of the data plane mirror app tier 1240 to app subnet(s) 1226 that can be contained in a data plane app tier 1246.

The data plane VCN 1218 can include the data plane app tier 1246, a data plane DMZ tier 1248, and a data plane data tier 1250. The data plane DMZ tier 1248 can include LB subnet(s) 1222 that can be communicatively coupled to the app subnet(s) 1226 of the data plane app tier 1246 and the Internet gateway 1234 of the data plane VCN 1218. The app subnet(s) 1226 can be communicatively coupled to the service gateway 1236 of the data plane VCN 1218 and the NAT gateway 1238 of the data plane VCN 1218. The data plane data tier 1250 can also include the DB subnet(s) 1230 that can be communicatively coupled to the app subnet(s) 1226 of the data plane app tier 1246.

The Internet gateway 1234 of the control plane VCN 1216 and of the data plane VCN 1218 can be communicatively coupled to a metadata management service 1252 that can be communicatively coupled to public Internet 1254. Public Internet 1254 can be communicatively coupled to the NAT gateway 1238 of the control plane VCN 1216 and of the data plane VCN 1218. The service gateway 1236 of the control plane VCN 1216 and of the data plane VCN 1218 can be communicatively couple to cloud services 1256.

In some examples, the service gateway 1236 of the control plane VCN 1216 or of the data plane VCN 1218 can make application programming interface (API) calls to cloud services 1256 without going through public Internet 1254. The API calls to cloud services 1256 from the service gateway 1236 can be one-way: the service gateway 1236 can make API calls to cloud services 1256, and cloud services 1256 can send requested data to the service gateway 1236. But, cloud services 1256 may not initiate API calls to the service gateway 1236.

In some examples, the secure host tenancy 1204 can be directly connected to the service tenancy 1219, which may be otherwise isolated. The secure host subnet 1208 can communicate with the SSH subnet 1214 through an LPG 1210 that may enable two-way communication over an otherwise isolated system. Connecting the secure host subnet 1208 to the SSH subnet 1214 may give the secure host subnet 1208 access to other entities within the service tenancy 1219.

The control plane VCN 1216 may allow users of the service tenancy 1219 to set up or otherwise provision desired resources. Desired resources provisioned in the control plane VCN 1216 may be deployed or otherwise used in the data plane VCN 1218. In some examples, the control plane VCN 1216 can be isolated from the data plane VCN 1218, and the data plane mirror app tier 1240 of the control plane VCN 1216 can communicate with the data plane app tier 1246 of the data plane VCN 1218 via VNICs 1242 that can be contained in the data plane mirror app tier 1240 and the data plane app tier 1246.

In some examples, users of the system, or customers, can make requests, for example create, read, update, or delete (CRUD) operations, through public Internet 1254 that can communicate the requests to the metadata management service 1252. The metadata management service 1252 can communicate the request to the control plane VCN 1216 through the Internet gateway 1234. The request can be received by the LB subnet(s) 1222 contained in the control plane DMZ tier 1220. The LB subnet(s) 1222 may determine that the request is valid, and in response to this determination, the LB subnet(s) 1222 can transmit the request to app subnet(s) 1226 contained in the control plane app tier 1224. If the request is validated and requires a call to public Internet 1254, the call to public Internet 1254 may be transmitted to the NAT gateway 1238 that can make the call to public Internet 1254. Metadata that may be desired to be stored by the request can be stored in the DB subnet(s) 1230.

In some examples, the data plane mirror app tier 1240 can facilitate direct communication between the control plane VCN 1216 and the data plane VCN 1218. For example, changes, updates, or other suitable modifications to configuration may be desired to be applied to the resources contained in the data plane VCN 1218. Via a VNIC 1242, the control plane VCN 1216 can directly communicate with, and can thereby execute the changes, updates, or other suitable modifications to configuration to, resources contained in the data plane VCN 1218

In some embodiments, the control plane VCN 1216 and the data plane VCN 1218 can be contained in the service tenancy 1219. In this case, the user, or the customer, of the system may not own or operate either the control plane VCN 1216 or the data plane VCN 1218. Instead, the IaaS provider may own or operate the control plane VCN 1216 and the data plane VCN 1218, both of which may be contained in the service tenancy 1219. This embodiment can enable isolation of networks that may prevent users or customers from interacting with other users', or other customers', resources. Also, this embodiment may allow users or customers of the system to store databases privately without needing to rely on public Internet 1254, which may not have a desired level of threat prevention, for storage.

In other embodiments, the LB subnet(s) 1222 contained in the control plane VCN 1216 can be configured to receive a signal from the service gateway 1236. In this embodiment, the control plane VCN 1216 and the data plane VCN 1218 may be configured to be called by a customer of the IaaS provider without calling public Internet 1254. Customers of the IaaS provider may desire this embodiment since database(s) that the customers use may be controlled by the IaaS provider and may be stored on the service tenancy 1219, which may be isolated from public Internet 1254

Figure 13:
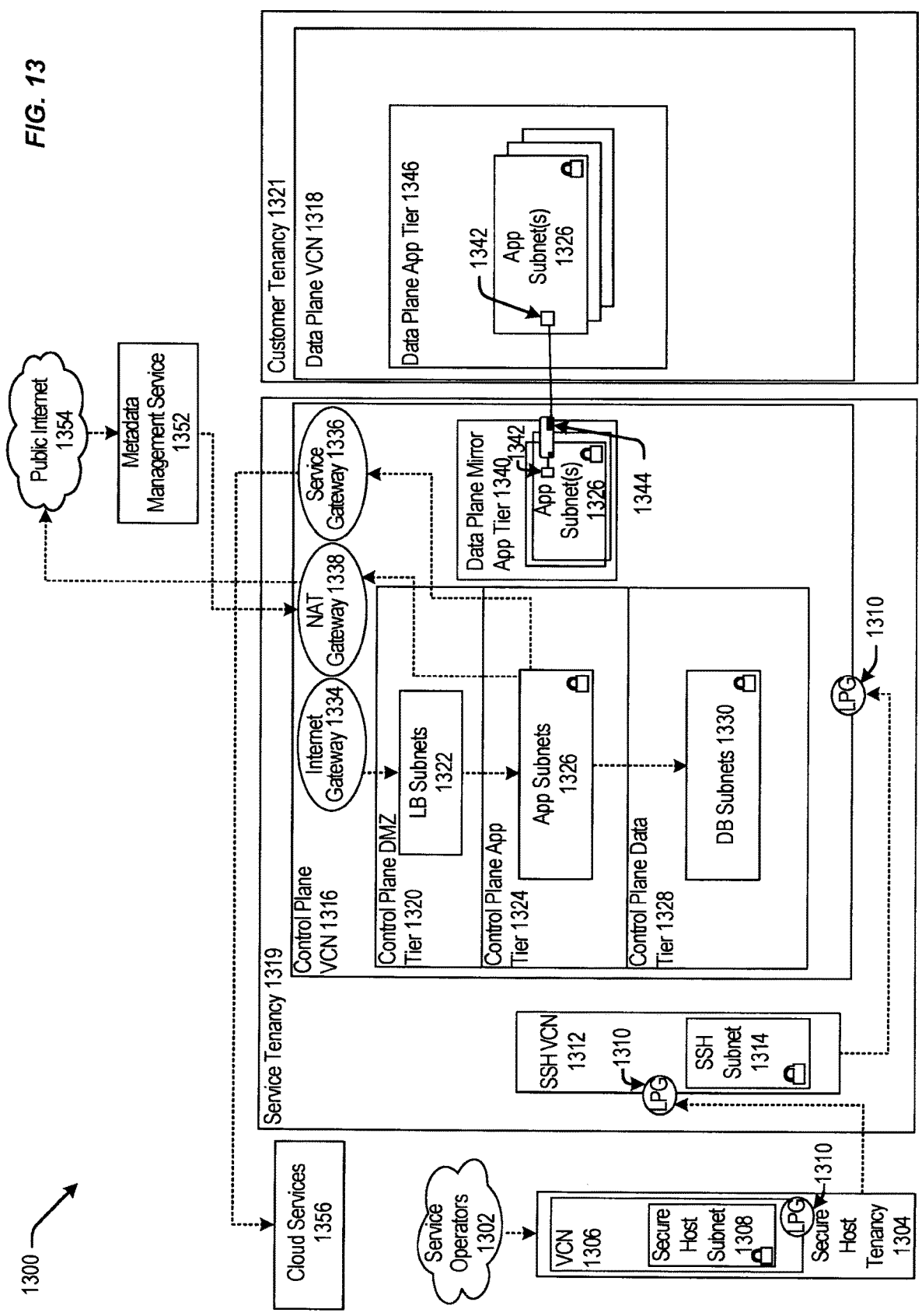
FIG. 13 is a block diagram illustrating another pattern for implementing a cloud infrastructure as a service system, according to one or more embodiments.

FIG. 13 is a block diagram 1300 illustrating another example pattern of an IaaS architecture, according to at least one embodiment. Service operators 1302 (e.g., service operators 1202 of FIG. 12) can be communicatively coupled to a secure host tenancy 1304 (e.g., the secure host tenancy 1204 of FIG. 12) that can include a virtual cloud network (VCN) 1306 (e.g., the VCN 1206 of FIG. 12) and a secure host subnet 1308 (e.g., the secure host subnet 1208 of FIG. 12). The VCN 1306 can include a local peering gateway (LPG) 1310 (e.g., the LPG 1210 of FIG. 12) that can be communicatively coupled to a secure shell (SSH) VCN 1312 (e.g., the SSH VCN 1212 of FIG. 12) via an LPG 1210 contained in the SSH VCN 1312. The SSH VCN 1312 can include an SSH subnet 1314 (e.g., the SSH subnet 1214 of FIG. 12), and the SSH VCN 1312 can be communicatively coupled to a control plane VCN 1316 (e.g., the control plane VCN 1216 of FIG. 12) via an LPG 1310 contained in the control plane VCN 1316. The control plane VCN 1316 can be contained in a service tenancy 1319 (e.g., the service tenancy 1219 of FIG. 12), and the data plane VCN 1318 (e.g., the data plane VCN 1218 of FIG. 12) can be contained in a customer tenancy 1321 that may be owned or operated by users, or customers, of the system.

The control plane VCN 1316 can include a control plane DMZ tier 1320 (e.g., the control plane DMZ tier 1220 of FIG. 12) that can include LB subnet(s) 1322 (e.g., LB subnet(s) 1222 of FIG. 12), a control plane app tier 1324 (e.g., the control plane app tier 1224 of FIG. 12) that can include app subnet(s) 1326 (e.g., app subnet(s) 1226 of FIG.

12), a control plane data tier 1328 (e.g., the control plane data tier 1228 of FIG. 12) that can include database (DB) subnet(s) 1330 (e.g., similar to DB subnet(s) 1230 of FIG. 12). The LB subnet(s) 1322 contained in the control plane DMZ tier 1320 can be communicatively coupled to the app subnet(s) 1326 contained in the control plane app tier 1324 and an Internet gateway 1334 (e.g., the Internet gateway 1234 of FIG. 12) that can be contained in the control plane VCN 1316, and the app subnet(s) 1326 can be communicatively coupled to the DB subnet(s) 1330 contained in the control plane data tier 1328 and a service gateway 1336 (e.g., the service gateway 1236 of FIG. 12) and a network address translation (NAT) gateway 1338 (e.g., the NAT gateway 1238 of FIG. 12). The control plane VCN 1316 can include the service gateway 1336 and the NAT gateway 1338.

The control plane VCN 1316 can include a data plane mirror app tier 1340 (e.g., the data plane mirror app tier 1240 of FIG. 12) that can include app subnet(s) 1326. The app subnet(s) 1326 contained in the data plane mirror app tier 1340 can include a virtual network interface controller (VNIC) 1342 (e.g., the VNIC of 1242) that can execute a compute instance 1344 (e.g., similar to the compute instance 1244 of FIG. 12). The compute instance 1344 can facilitate communication between the app subnet(s) 1326 of the data plane mirror app tier 1340 and the app subnet(s) 1326 that can be contained in a data plane app tier 1346 (e.g., the data plane app tier 1246 of FIG. 12) via the VNIC 1342 contained in the data plane mirror app tier 1340 and the VNIC 1342 contained in the data plane app tier 1346

The Internet gateway 1334 contained in the control plane VCN 1316 can be communicatively coupled to a metadata management service 1352 (e.g., the metadata management service 1252 of FIG. 12) that can be communicatively coupled to public Internet 1354 (e.g., public Internet 1254 of FIG. 12). Public Internet 1354 can be communicatively coupled to the NAT gateway 1338 contained in the control plane VCN 1316. The service gateway 1336 contained in the control plane VCN 1316 can be communicatively couple to cloud services 1356 (e.g., cloud services 1256 of FIG. 12)

In some examples, the data plane VCN 1318 can be contained in the customer tenancy 1321. In this case, the IaaS provider may provide the control plane VCN 1316 for each customer, and the IaaS provider may, for each customer, set up a unique compute instance 1344 that is contained in the service tenancy 1319. Each compute instance 1344 may allow communication between the control plane VCN 1316, contained in the service tenancy 1319, and the data plane VCN 1318 that is contained in the customer tenancy 1321. The compute instance 1344 may allow resources, which are provisioned in the control plane VCN 1316 that is contained in the service tenancy 1319, to be deployed or otherwise used in the data plane VCN 1318 that is contained in the customer tenancy 1321.

In other examples, the customer of the IaaS provider may have databases that live in the customer tenancy 1321. In this example, the control plane VCN 1316 can include the data plane mirror app tier 1340 that can include app subnet(s) 1326. The data plane mirror app tier 1340 can reside in the data plane VCN 1318, but the data plane mirror app tier 1340 may not live in the data plane VCN 1318. That is, the data plane mirror app tier 1340 may have access to the customer tenancy 1321, but the data plane mirror app tier 1340 may not exist in the data plane VCN 1318 or be owned or operated by the customer of the IaaS provider. The data plane mirror app tier 1340 may be configured to make calls to the data plane VCN 1318 but may not be configured to make calls to any entity contained in the control plane VCN 1316. The customer may desire to deploy or otherwise use resources in the data plane VCN 1318 that are provisioned in the control plane VCN 1316, and the data plane mirror app tier 1340 can facilitate the desired deployment, or other usage of resources, of the customer.

In some embodiments, the customer of the IaaS provider can apply filters to the data plane VCN 1318. In this embodiment, the customer can determine what the data plane VCN 1318 can access, and the customer may restrict access to public Internet 1354 from the data plane VCN 1318. The IaaS provider may not be able to apply filters or otherwise control access of the data plane VCN 1318 to any outside networks or databases. Applying filters and controls by the customer onto the data plane VCN 1318, contained in the customer tenancy 1321, can help isolate the data plane VCN 1318 from other customers and from public Internet 1354

In some embodiments, cloud services 1356 can be called by the service gateway 1336 to access services that may not exist on public Internet 1354, on the control plane VCN 1316, or on the data plane VCN 1318. The connection between cloud services 1356 and the control plane VCN 1316 or the data plane VCN 1318 may not be live or continuous. Cloud services 1356 may exist on a different network owned or operated by the IaaS provider. Cloud services 1356 may be configured to receive calls from the service gateway 1336 and may be configured to not receive calls from public Internet 1354. Some cloud services 1356 may be isolated from other cloud services 1356, and the control plane VCN 1316 may be isolated from cloud services 1356 that may not be in the same region as the control plane VCN 1316. For example, the control plane VCN 1316 may be located in "Region 1," and cloud service "Deployment 12," may be located in Region 1 and in "Region 2." If a call to Deployment 12 is made by the service gateway 1336 contained in the control plane VCN 1316 located in Region 1, the call may be transmitted to Deployment 12 in Region 1. In this example, the control plane VCN 1316, or Deployment 12 in Region 1, may not be communicatively coupled to, or otherwise in communication with, Deployment 12 in Region 2

Figure 14:
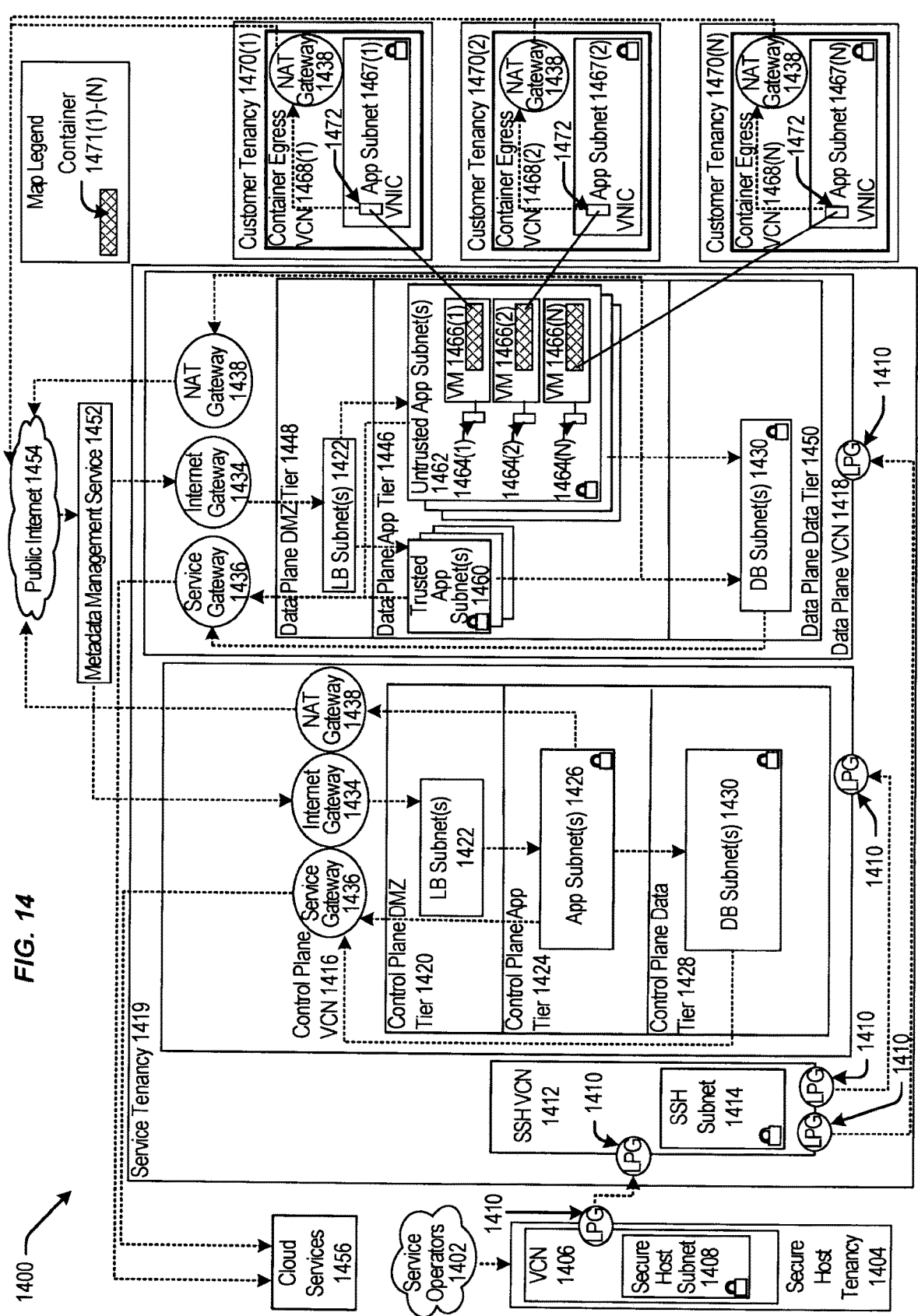
FIG. 14 is a block diagram illustrating another pattern for implementing a cloud infrastructure as a service system, according to one or more embodiments.

FIG. 14 is a block diagram 1400 illustrating another example pattern of an IaaS architecture, according to at least one embodiment. Service operators 1402 (e.g., service operators 1202 of FIG. 12) can be communicatively coupled to a secure host tenancy 1404 (e.g., the secure host tenancy 1204 of FIG. 12) that can include a virtual cloud network (VCN) 1406 (e.g., the VCN 1206 of FIG. 12) and a secure host subnet 1408 (e.g., the secure host subnet 1208 of FIG. 12). The VCN 1406 can include an LPG 1410 (e.g., the LPG 1210 of FIG. 12) that can be communicatively coupled to an SSH VCN 1412 (e.g., the SSH VCN 1212 of FIG. 12) via an LPG 1410 contained in the SSH VCN 1412. The SSH VCN 1412 can include an SSH subnet 1414 (e.g., the SSH subnet 1214 of FIG. 12), and the SSH VCN 1412 can be communicatively coupled to a control plane VCN 1416 (e.g., the control plane VCN 1216 of FIG. 12) via an LPG 1410 contained in the control plane VCN 1416 and to a data plane VCN 1418 (e.g., the data plane 1218 of FIG. 12) via an LPG 1410 contained in the data plane VCN 1418. The control plane VCN 1416 and the data plane VCN 1418 can be contained in a service tenancy 1419 (e.g., the service tenancy 1219 of FIG. 12).

The control plane VCN 1416 can include a control plane DMZ tier 1420 (e.g., the control plane DMZ tier 1220 of FIG. 12) that can include load balancer (LB) subnet(s) 1422

(e.g., LB subnet(s) 1222 of FIG. 12), a control plane app tier 1424 (e.g., the control plane app tier 1224 of FIG. 12) that can include app subnet(s) 1426 (e.g., similar to app subnet(s) 1226 of FIG. 12), a control plane data tier 1428 (e.g., the control plane data tier 1228 of FIG. 12) that can include DB subnet(s) 1430. The LB subnet(s) 1422 contained in the control plane DMZ tier 1420 can be communicatively coupled to the app subnet(s) 1426 contained in the control plane app tier 1424 and to an Internet gateway 1434 (e.g., the Internet gateway 1234 of FIG. 12) that can be contained in the control plane VCN 1416, and the app subnet(s) 1426 can be communicatively coupled to the DB subnet(s) 1430 contained in the control plane data tier 1428 and to a service gateway 1436 (e.g., the service gateway of FIG. 12) and a network address translation (NAT) gateway 1438 (e.g., the NAT gateway 1238 of FIG. 12). The control plane VCN 1416 can include the service gateway 1436 and the NAT gateway 1438.

The data plane VCN 1418 can include a data plane app tier 1446 (e.g., the data plane app tier 1246 of FIG. 12), a data plane DMZ tier 1448 (e.g., the data plane DMZ tier 1248 of FIG. 12), and a data plane data tier 1450 (e.g., the data plane data tier 1250 of FIG. 12). The data plane DMZ tier 1448 can include LB subnet(s) 1422 that can be communicatively coupled to trusted app subnet(s) 1460 and untrusted app subnet(s) 1462 of the data plane app tier 1446 and the Internet gateway 1434 contained in the data plane VCN 1418. The trusted app subnet(s) 1460 can be communicatively coupled to the service gateway 1436 contained in the data plane VCN 1418, the NAT gateway 1438 contained in the data plane VCN 1418, and DB subnet(s) 1430 contained in the data plane data tier 1450. The untrusted app subnet(s) 1462 can be communicatively coupled to the service gateway 1436 contained in the data plane VCN 1418 and DB subnet(s) 1430 contained in the data plane data tier 1450. The data plane data tier 1450 can include DB subnet(s) 1430 that can be communicatively coupled to the service gateway 1436 contained in the data plane VCN 1418.

The untrusted app subnet(s) 1462 can include one or more primary VNICs 1464(1)-(N) that can be communicatively coupled to tenant virtual machines (VMs) 1466(1)-(N). Each tenant VM 1466(1)-(N) can be communicatively coupled to a respective app subnet 1467(1)-(N) that can be contained in respective container egress VCNs 1468(1)-(N) that can be contained in respective customer tenancies 1470(1)-(N). Respective secondary VNICs 1472(1)-(N) can facilitate communication between the untrusted app subnet(s) 1462 contained in the data plane VCN 1418 and the app subnet contained in the container egress VCNs 1468(1)-(N). Each container egress VCNs 1468(1)-(N) can include a NAT gateway 1438 that can be communicatively coupled to public Internet 1454 (e.g., public Internet 1254 of FIG. 12).

The Internet gateway 1434 contained in the control plane VCN 1416 and contained in the data plane VCN 1418 can be communicatively coupled to a metadata management service 1452 (e.g., the metadata management system 1252 of FIG. 12) that can be communicatively coupled to public Internet 1454. Public Internet 1454 can be communicatively coupled to the NAT gateway 1438 contained in the control plane VCN 1416 and contained in the data plane VCN 1418. The service gateway 1436 contained in the control plane VCN 1416 and contained in the data plane VCN 1418 can be communicatively couple to cloud services 1456.

In some embodiments, the data plane VCN 1418 can be integrated with customer tenancies 1470. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1446. Code to run the function may be executed in the VMs 1466(1)-(N), and the code may not be configured to run anywhere else on the data plane VCN 1418. Each VM 1466(1)-(N) may be connected to one customer tenancy 1470. Respective containers 1471(1)-(N) contained in the VMs 1466(1)-(N) may be configured to run the code. In this case, there can be a dual isolation (e.g., the containers 1471(1)-(N) running code, where the containers 1471(1)-(N) may be contained in at least the VM 1466(1)-(N) that are contained in the untrusted app subnet(s) 1462), which may help prevent incorrect or otherwise undesirable code from damaging the network of the IaaS provider or from damaging a network of a different customer. The containers 1471(1)-(N) may be communicatively coupled to the customer tenancy 1470 and may be configured to transmit or receive data from the customer tenancy 1470. The containers 1471(1)-(N) may not be configured to transmit or receive data from any other entity in the data plane VCN 1418. Upon completion of running the code, the IaaS provider may kill or otherwise dispose of the containers 1471(1)-(N).

In some embodiments, the trusted app subnet(s) 1460 may run code that may be owned or operated by the IaaS provider. In this embodiment, the trusted app subnet(s) 1460 may be communicatively coupled to the DB subnet(s) 1430 and be configured to execute CRUD operations in the DB subnet(s) 1430. The untrusted app subnet(s) 1462 may be communicatively coupled to the DB subnet(s) 1430, but in this embodiment, the untrusted app subnet(s) may be configured to execute read operations in the DB subnet(s) 1430. The containers 1471(1)-(N) that can be contained in the VM 1466(1)-(N) of each customer and that may run code from the customer may not be communicatively coupled with the DB subnet(s) 1430.

In other embodiments, the control plane VCN 1416 and the data plane VCN 1418 may not be directly communicatively coupled. In this embodiment, there may be no direct communication between the control plane VCN 1416 and the data plane VCN 1418. However, communication can occur indirectly through at least one method. An LPG 1410 may be established by the IaaS provider that can facilitate communication between the control plane VCN 1416 and the data plane VCN 1418. In another example, the control plane VCN 1416 or the data plane VCN 1418 can make a call to cloud services 1456 via the service gateway 1436. For example, a call to cloud services 1456 from the control plane VCN 1416 can include a request for a service that can communicate with the data plane VCN 1418.

Figure 15:
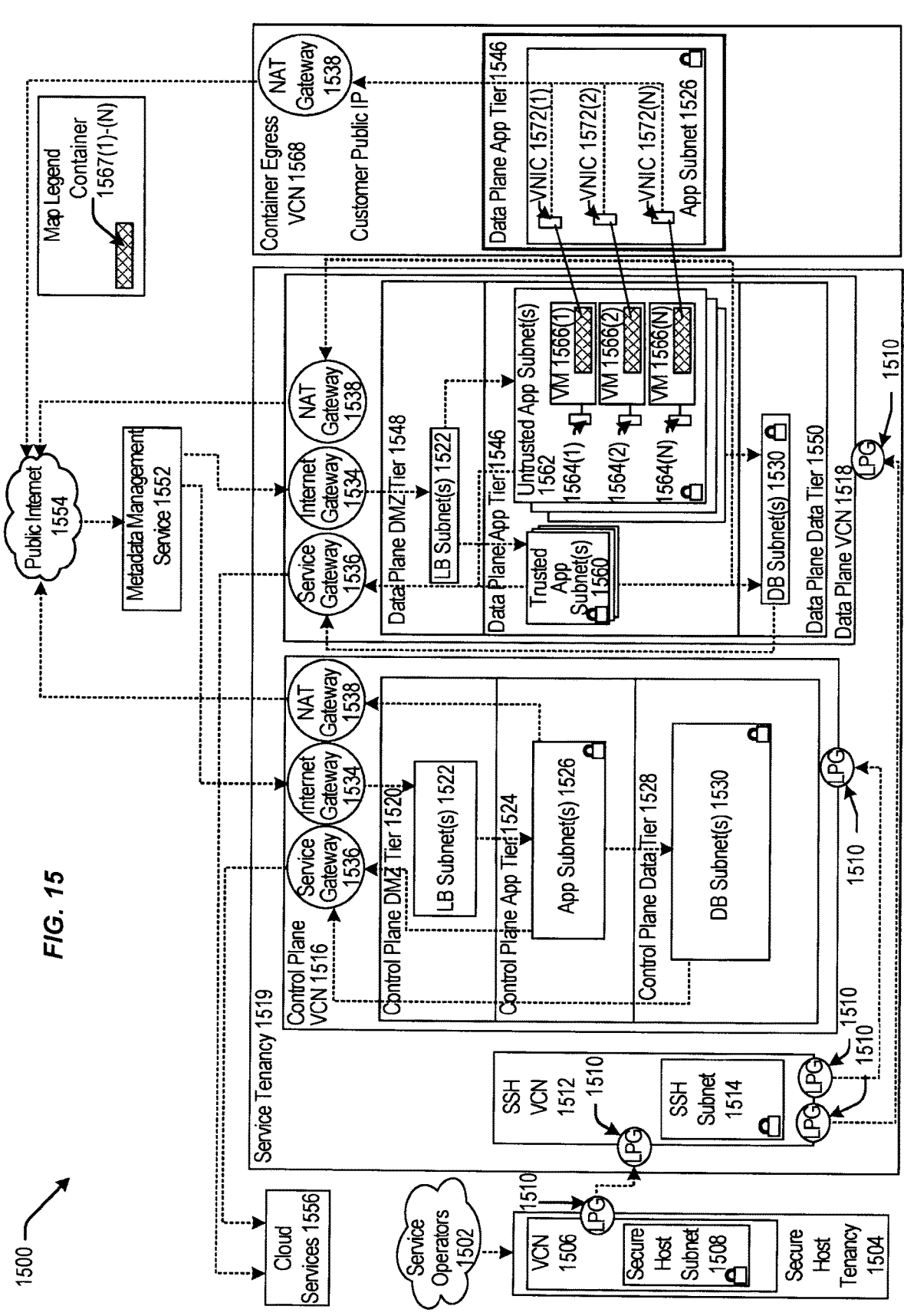
FIG. 15 is a block diagram illustrating another pattern for implementing a cloud infrastructure as a service system, according to one or more embodiments.

FIG. 15 is a block diagram 1500 illustrating another example pattern of an IaaS architecture, according to at least one embodiment. Service operators 1502 (e.g., service operators 1202 of FIG. 12) can be communicatively coupled to a secure host tenancy 1504 (e.g., the secure host tenancy 1204 of FIG. 12) that can include a virtual cloud network (VCN) 1506 (e.g., the VCN 1206 of FIG. 12) and a secure host subnet 1508 (e.g., the secure host subnet 1208 of FIG. 12). The VCN 1506 can include an LPG 1510 (e.g., the LPG 1210 of FIG. 12) that can be communicatively coupled to an SSH VCN 1512 (e.g., the SSH VCN 1212 of FIG. 12) via an LPG 1510 contained in the SSH VCN 1512. The SSH VCN 1512 can include an SSH subnet 1514 (e.g., the SSH subnet 1214 of FIG. 12), and the SSH VCN 1512 can be communicatively coupled to a control plane VCN 1516 (e.g., the control plane VCN 1216 of FIG. 12) via an LPG 1510 contained in the control plane VCN 1516 and to a data plane VCN 1518 (e.g., the data plane 1218 of FIG. 12) via an LPG 1510 contained in the data plane VCN 1518. The control plane VCN 1516 and the data plane VCN 1518 can be contained in a service tenancy 1519 (e.g., the service tenancy 1219 of FIG. 12).

The control plane VCN 1516 can include a control plane DMZ tier 1520 (e.g., the control plane DMZ tier 1220 of FIG. 12) that can include LB subnet(s) 1522 (e.g., LB subnet(s) 1222 of FIG. 12), a control plane app tier 1524 (e.g., the control plane app tier 1224 of FIG. 12) that can include app subnet(s) 1526 (e.g., app subnet(s) 1226 of FIG. 12), a control plane data tier 1528 (e.g., the control plane data tier 1228 of FIG. 12) that can include DB subnet(s) 1530 (e.g., DB subnet(s) 1430 of FIG. 14). The LB subnet(s) 1522 contained in the control plane DMZ tier 1520 can be communicatively coupled to the app subnet(s) 1526 contained in the control plane app tier 1524 and to an Internet gateway 1534 (e.g., the Internet gateway 1234 of FIG. 12) that can be contained in the control plane VCN 1516, and the app subnet(s) 1526 can be communicatively coupled to the DB subnet(s) 1530 contained in the control plane data tier 1528 and to a service gateway 1536 (e.g., the service gateway of FIG. 12) and a network address translation (NAT) gateway 1538 (e.g., the NAT gateway 1238 of FIG. 12). The control plane VCN 1516 can include the service gateway 1536 and the NAT gateway 1538.

The data plane VCN 1518 can include a data plane app tier 1546 (e.g., the data plane app tier 1246 of FIG. 12), a data plane DMZ tier 1548 (e.g., the data plane DMZ tier 1248 of FIG. 12), and a data plane data tier 1550 (e.g., the data plane data tier 1250 of FIG. 12). The data plane DMZ tier 1548 can include LB subnet(s) 1522 that can be communicatively coupled to trusted app subnet(s) 1560 (e.g., trusted app subnet(s) 1460 of FIG. 14) and untrusted app subnet(s) 1562 (e.g., untrusted app subnet(s) 1462 of FIG. 14) of the data plane app tier 1546 and the Internet gateway 1534 contained in the data plane VCN 1518. The trusted app subnet(s) 1560 can be communicatively coupled to the service gateway 1536 contained in the data plane VCN 1518, the NAT gateway 1538 contained in the data plane VCN 1518, and DB subnet(s) 1530 contained in the data plane data tier 1550. The untrusted app subnet(s) 1562 can be communicatively coupled to the service gateway 1536 contained in the data plane VCN 1518 and DB subnet(s) 1530 contained in the data plane data tier 1550. The data plane data tier 1550 can include DB subnet(s) 1530 that can be communicatively coupled to the service gateway 1536 contained in the data plane VCN 1518

The untrusted app subnet(s) 1562 can include primary VNICs 1564(1)-(N) that can be communicatively coupled to tenant virtual machines (VMs) 1566(1)-(N) residing within the untrusted app subnet(s) 1562. Each tenant VM 1566(1)-(N) can run code in a respective container 1567(1)-(N), and be communicatively coupled to an app subnet 1526 that can be contained in a data plane app tier 1546 that can be contained in a container egress VCN 1568. Respective secondary VNICs 1572(1)-(N) can facilitate communication between the untrusted app subnet(s) 1562 contained in the data plane VCN 1518 and the app subnet contained in the container egress VCN 1568. The container egress VCN can include a NAT gateway 1538 that can be communicatively coupled to public Internet 1554 (e.g., public Internet 1254 of FIG. 12)

The Internet gateway 1534 contained in the control plane VCN 1516 and contained in the data plane VCN 1518 can be communicatively coupled to a metadata management service 1552 (e.g., the metadata management system 1252 of FIG. 12) that can be communicatively coupled to public Internet 1554. Public Internet 1554 can be communicatively coupled to the NAT gateway 1538 contained in the control plane VCN 1516 and contained in the data plane VCN 1518. The service gateway 1536 contained in the control plane VCN 1516 and contained in the data plane VCN 1518 can be communicatively couple to cloud services 1556.

In some examples, the pattern illustrated by the architecture of block diagram 1500 of FIG. 15 may be considered an exception to the pattern illustrated by the architecture of block diagram 1400 of FIG. 14 and may be desirable for a customer of the IaaS provider if the IaaS provider cannot directly communicate with the customer (e.g., a disconnected region). The respective containers 1567(1)-(N) that are contained in the VMs 1566(1)-(N) for each customer can be accessed in real-time by the customer. The containers 1567(1)-(N) may be configured to make calls to respective secondary VNICs 1572(1)-(N) contained in app subnet(s) 1526 of the data plane app tier 1546 that can be contained in the container egress VCN 1568. The secondary VNICs 1572(1)-(N) can transmit the calls to the NAT gateway 1538 that may transmit the calls to public Internet 1554. In this example, the containers 1567(1)-(N) that can be accessed in real-time by the customer can be isolated from the control plane VCN 1516 and can be isolated from other entities contained in the data plane VCN 1518. The containers 1567(1)-(N) may also be isolated from resources from other customers.

In other examples, the customer can use the containers 1567(1)-(N) to call cloud services 1556. In this example, the customer may run code in the containers 1567(1)-(N) that requests a service from cloud services 1556. The containers 1567(1)-(N) can transmit this request to the secondary VNICs 1572(1)-(N) that can transmit the request to the NAT gateway that can transmit the request to public Internet 1554. Public Internet 1554 can transmit the request to LB subnet(s) 1522 contained in the control plane VCN 1516 via the Internet gateway 1534. In response to determining the request is valid, the LB subnet(s) can transmit the request to app subnet(s) 1526 that can transmit the request to cloud services 1556 via the service gateway 1536.

It should be appreciated that IaaS architectures 1200, 1300, 1400, 1500 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 16:
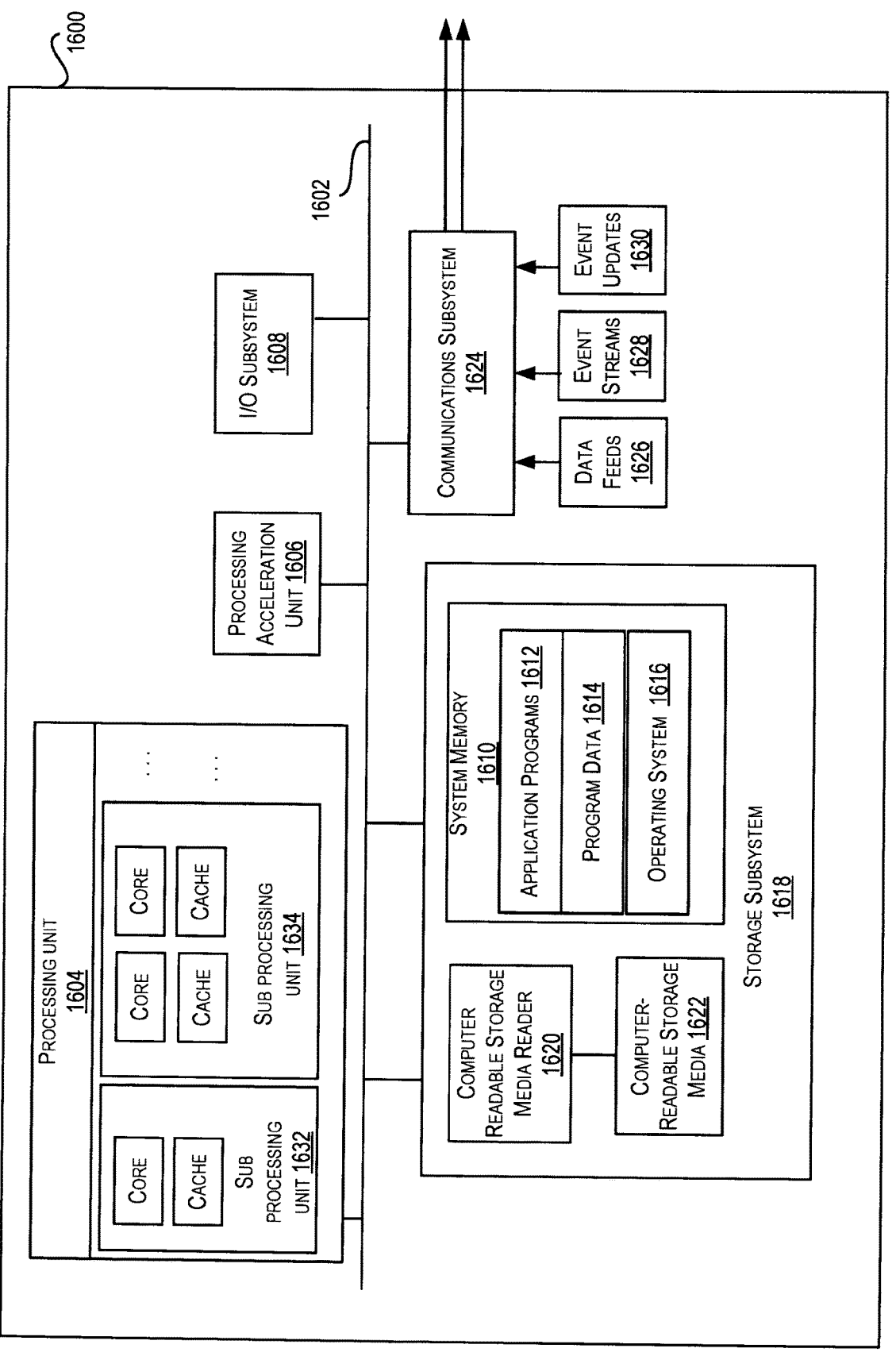
FIG. 16 is a block diagram illustrating an example computer system, according to one or more embodiments.

FIG. 16 illustrates an example computer system 1600, in which various embodiments may be implemented. The system 1600 may be used to implement any of the computer systems described above. As shown in the figure, computer system 1600 includes a processing unit 1604 that communicates with a number of peripheral subsystems via a bus subsystem 1602. These peripheral subsystems may include a processing acceleration unit 1606, an I/O subsystem 1608, a storage subsystem 1618 and a communications subsystem 1624. Storage subsystem 1618 includes tangible computer-readable storage media 1622 and a system memory 1610.

Bus subsystem 1602 provides a mechanism for letting the various components and subsystems of computer system 1600 communicate with each other as intended. Although bus subsystem 1602 is shown schematically as a single bus, alternative embodiments of the bus subsystem may utilize multiple buses. Bus subsystem 1602 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1604, which can be implemented as one or more integrated circuits (e.g., a conventional microprocessor or microcontroller), controls the operation of computer system 1600. One or more processors may be included in processing unit 1604. These processors may include single core or multicore processors. In certain embodiments, processing unit 1604 may be implemented as one or more independent processing units 1632 and/or 1634 with single or multicore processors included in each processing unit. In other embodiments, processing unit 1604 may also be implemented as a quad-core processing unit formed by integrating two dual-core processors into a single chip.

In various embodiments, processing unit 1604 can execute a variety of programs in response to program code and can maintain multiple concurrently executing programs or processes. At any given time, some or all of the program code to be executed can be resident in processor(s) 1604 and/or in storage subsystem 1618. Through suitable programming, processor(s) 1604 can provide various functionalities described above. Computer system 1600 may additionally include a processing acceleration unit 1606, which can include a digital signal processor (DSP), a special-purpose processor, and/or the like.

I/O subsystem 1608 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1600 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1600 may comprise a storage subsystem 1618 that comprises software elements, shown as being currently located within a system memory 1610. System memory 1610 may store program instructions that are loadable and executable on processing unit 1604, as well as data generated during the execution of these programs.

Depending on the configuration and type of computer system 1600, system memory 1610 may be volatile (such as random access memory (RAM)) and/or non-volatile (such as read-only memory (ROM), flash memory, etc.) The RAM typically contains data and/or program services that are immediately accessible to and/or presently being operated and executed by processing unit 1604. In some implementations, system memory 1610 may include multiple different types of memory, such as static random access memory (SRAM) or dynamic random access memory (DRAM). In some implementations, a basic input/output system (BIOS), containing the basic routines that help to transfer information between elements within computer system 1600, such as during start-up, may typically be stored in the ROM. By way of example, and not limitation, system memory 1610 also illustrates application programs 1612, which may include client applications, Web browsers, mid-tier applications, relational database management systems (RDBMS), etc., program data 1614, and an operating system 1616. By way of example, operating system 1616 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems.

Storage subsystem 1618 may also provide a tangible computer-readable storage medium for storing the basic programming and data constructs that provide the functionality of some embodiments. Software (programs, code services, instructions) that when executed by a processor provide the functionality described above may be stored in storage subsystem 1618. These software services or instructions may be executed by processing unit 1604. Storage subsystem 1618 may also provide a repository for storing data used in accordance with the present disclosure.

Storage subsystem 1600 may also include a computer-readable storage media reader 1620 that can further be connected to computer-readable storage media 1622. Together and, optionally, in combination with system memory 1610, computer-readable storage media 1622 may comprehensively represent remote, local, fixed, and/or removable storage devices plus storage media for temporarily and/or more permanently containing, storing, transmitting, and retrieving computer-readable information.

Computer-readable storage media 1622 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1600.

By way of example, computer-readable storage media 1622 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1622 may include, but is not limited to, Zip® drives, flash memory cards, universal serial bus (USB) flash drives, secure digital (SD) cards, DVD disks, digital video tape, and the like. Computer-readable storage media 1622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program services, and other data for computer system 1600.

Communications subsystem 1624 provides an interface to other computer systems and networks. Communications subsystem 1624 serves as an interface for receiving data from and transmitting data to other systems from computer system 1600. For example, communications subsystem 1624 may enable computer system 1600 to connect to one or more devices via the Internet. In some embodiments communications subsystem 1624 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1624 can provide wired network connectivity (e.g., Ethernet) in addition to or instead of a wireless interface.

In some embodiments, communications subsystem 1624 may also receive input communication in the form of structured and/or unstructured data feeds 1626, event streams 1628, event updates 1630, and the like on behalf of one or more users who may use computer system 1600.

By way of example, communications subsystem 1624 may be configured to receive data feeds 1626 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1624 may also be configured to receive data in the form of continuous data streams, which may include event streams 1628 of real-time events and/or event updates 1630, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1624 may also be configured to output the structured and/or unstructured data feeds 1626, event streams 1628, event updates 1630, and the like to one or more databases that may be in communication with one or more streaming data source computers coupled to computer system 1600.

Computer system 1600 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Although specific embodiments have been described, various modifications, alterations, alternative constructions, and equivalents are also encompassed within the scope of the disclosure. Embodiments are not restricted to operation within certain specific data processing environments but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:

generating, by a computing system, first training data comprising extensible markup language (XML) content, the first training data comprising a first plurality of training instances, each training instance including a respective image comprising XML content and annotation information for the respective image, the first plurality of training instances comprising multiple subsets of training instances, each subset of the multiple subsets comprising a plurality of images, each image of the plurality of images of a subset comprising XML content in a candidate font selected from a set of candidate fonts;

training, by the computing system, a first plurality of machine learning models using the first training data to generate a first plurality of trained machine learning models, to perform image-based XML content extraction;

for each subset of training instances from the multiple subsets of training instances, determining, by the computing system, a performance metric value for the first plurality of trained machine learning models for the subset of training instances;

identifying, by the computing system, a particular font from the set of candidate fonts that corresponds to a subset of training instances from the multiple subsets of training instances for which a highest performance metric value was measured for the first plurality of trained machine learning models;

generating, by the computing system, second training data comprising XML content in the identified particular font, the second training data comprising a second plurality of training instances;

training, by the computing system, a second plurality of machine learning models using the second training data, wherein a first training instance in the second training data is a first XML document comprising an XML tag with a first randomized value and a second training instance in the second training data is a second XML document comprising an XML tag with a second randomized value; and deploying, by the computing system, the trained second plurality of machine learning models to a target system to perform image-based XML content extraction.

2. The method of claim 1, wherein:

training the first plurality of machine learning models comprises:

for each subset of the multiple subsets of training instances:

training the first plurality of machine learning models using the subset; and validating the first plurality of machine learning models using a portion of the first training data, wherein the validating comprises measuring the performance metric value for the first plurality of machine learning models for the subset; and identifying the particular font of the set of candidate fonts corresponding to the subset from the multiple subsets for which the highest performance metric value was measured for the the first plurality of machine learning models.

3. The method of claim 2, wherein the method further comprises:

receiving, a signal indicating selection of the particular font;

generating the second training data, the second training data comprising the second plurality of training instances, each training instance in the second plurality of training instances including a respective image comprising XML content in the particular font and annotation information for the respective image; and training the second plurality of machine learning models comprises training the second plurality of machine learning models using the second training data.

4. The method of claim 3, wherein generating the second training data further comprises:

generating the first training instance in the second plurality of training instances, wherein the first randomized value is in a first location relative to the other content in the first XML document;

generating the second training instance in the second plurality of training instances, wherein the second randomized value is in a second location relative to the other content in the second XML document, wherein the first location is different from the second location and the first randomized value is different than the second randomized value.

5. The method of claim 1, wherein generating the first plurality of training instances for the first plurality of machine learning models comprises:

receiving a data pattern to be used to generate the first plurality of training instances;

determining a plurality of XML tag pairs in each training instance of the first plurality of training instances; and determining a respective XML values to be arranged between each XML tag pair of the plurality of XML tag pairs based at least in part on the data pattern.

6. The method of claim 5, wherein each XML tag pair of the plurality of XML tag pairs can be randomly arranged in the XML content or arranged in a particular position based at least in part on the data pattern, and wherein each respective XML value can be a randomly generated XML value or a desired XML value based at least in part on the data pattern.

7. The method of claim 1, wherein the first plurality of machine learning models comprise a text detection model configured to detect a line of text of the XML content, a bounding box direction classification model configured to directionally align the line of text, a text recognition model configured to identify text characters in the line of text, or a word splitter model configured to identify words in the line of text.

8. The method of claim 1, wherein the method further comprises extracting first XML content from a first input image and outputting the extracted first XML content in a text format.

33

9. A computing system, comprising:

one or more processors; and a computer-readable medium including instructions that, when executed by the one or more processors, cause the computing system to perform operations comprising:

generating first training data comprising extensible markup language (XML) content, the first training data comprising a first plurality of training instances, each training instance including a respective image comprising XML content and annotation information for the respective image, the first plurality of training instances comprising multiple subsets of training instances, each subset of the multiple subsets comprising a plurality of images, each image of the plurality of images of a subset comprising XML content in a candidate font selected from a set of candidate fonts;

training a first plurality of machine learning models using the first training data to generate a first plurality of trained machine learning models, to perform image-based XML content extraction;

for each subset of training instances from the multiple subsets of training instances, determining a performance metric value for the first plurality of trained machine learning models for the subset of training instances;

identifying a particular font from the set of candidate fonts that corresponds to a subset of training instances from the multiple subsets of training instances for which a highest performance metric value was measured for the first plurality of trained machine learning models;

generating second training data comprising XML content in the identified particular font, the second training data comprising a second plurality of training instances;

training a second plurality of machine learning models using the second training data, wherein a first training instance in the second training data is a first XML document comprising an XML tag with a first randomized value and a second training instance in the second training data is a second XML document comprising an XML tag with a second randomized value; and deploying the trained second plurality of machine learning models to a target system to perform image-based XML content extraction.

10. The computing system of claim 9, wherein:

training the first plurality of machine learning models comprises:

for each subset of the multiple subsets of training instances:

training the first plurality of machine learning models using the subset; and validating the first plurality of machine learning models using a portion of the first training data, wherein the validating comprises measuring the performance metric value for the first plurality of machine learning models for the subset; and identifying the particular font of the set of candidate fonts corresponding to the subset from the multiple subsets for which the highest performance metric value was measured for the first plurality of machine learning models.

11. The computing system of claim 10, wherein the instructions that, when executed by the one or more processors, further cause the computing system to perform operations comprising:

receiving, a signal indicating selection of the particular font;

generating the second training data, the second training data comprising the second plurality of training instances, each training instance in the second plurality of training instances including a respective image comprising XML content in the particular font and annotation information for the respective image; and training the second plurality of machine learning models comprises training the second plurality of machine learning models using the second training data.

12. The computing system of claim 11, wherein generating the second training data further comprises:

generating the first training instance in the second plurality of training instances, wherein the first randomized value is in a first location relative to the other content in the first XML document;

generating the second training instance in the second plurality of training instances, wherein the second randomized value is in a second location relative to the other content in the second XML document, wherein the first location is different from the second location and the first randomized value is different than the second randomized value.

13. The computing system of claim 9, wherein generating the first plurality of training instances for the first plurality of machine learning models comprises:

receiving a data pattern to be used to generate the first plurality of training instances;

determining a plurality of XML tag pairs in each training instance of the first plurality of training instances; and determining a respective XML values to be arranged between each XML tag pair of the plurality of XML tag pairs based at least in part on the data pattern.

14. The computing system of claim 13, wherein each XML tag pair of the plurality of XML tag pairs can be randomly arranged in the XML content or arranged in a particular position based at least in part on the data pattern, and wherein each respective XML value can be a randomly generated XML value or a desired XML value based at least in part on the data pattern.

15. The computing system of claim 9, wherein the first plurality of machine learning models comprise a text detection model configured to detect a line of text of the XML content, a bounding box direction classification model configured to directionally align the line of text, a text recognition model configured to identify text characters in the line of text, or a word splitter model configured to identify words in the line of text.

16. The computing system of claim 9, wherein the instructions that, when executed by the one or more processors, further cause the computing system to perform operations comprising extracting first XML content from a first input image and outputting the extracted first XML content in a text format.

17. A non-transitory computer-readable medium including stored thereon a sequence of instructions that, when executed by a processor, causes a computing system to perform operations comprising:

receiving an image comprising extensible markup language (XML) content;

extracting the XML content from the image using a first plurality of trained machine learning models, the first plurality of machine learning models trained to extract the XML content from the image, wherein the first plurality of machine learning models are trained by generating a first training data comprising a first plurality of training instances, wherein each training instance of the first plurality of training instances includes a respective image comprising XML content and annotation information for the respective image, the first plurality of training instances comprising multiple subsets of training instances, each subset of the multiple subsets comprising a plurality of images, each image of the plurality of images of a subset comprising XML content in a candidate font selected from a set of candidate fonts and wherein the first plurality of machine learning models are further trained to perform image-based XML content extraction by using the first training data as training inputs;

generating, using the first plurality of trained machine learning models, a file comprising the XML content, the XML content in a text format;

for each subset of training instances from the multiple subsets of training instances, determining a performance metric value for the first plurality of trained machine learning models for the subset of training instances;

identifying a particular font from the set of candidate fonts that corresponds to a subset of training instances from the multiple subsets of training instances for which a highest performance metric value was measured for the first plurality of trained machine learning models;

generating second training data comprising XML content in the identified particular font, the second training data comprising a second plurality of training instances;

training a second plurality of machine learning models using the second training data, wherein a first training instance in the second training data is a first XML document comprising an XML tag with a first randomized value and a second training instance in the second training data is a second XML document comprising an XML tag with a second randomized value; and deploying the trained second plurality of machine learning models to a target system to perform image-based XML content extraction.

18. The non-transitory computer-readable medium of claim 17, wherein:

training the first plurality of machine learning models comprises:

for each subset of the multiple subsets of training instances:

training the first plurality of machine learning models using the subset; and validating the first plurality of machine learning models using a portion of the first training data, wherein the validating comprises measuring the performance metric value for the first plurality of machine learning models for the subset; and identifying the particular font of the set of candidate fonts corresponding to the subset from the multiple subsets for which the highest performance metric value was measured for the first plurality of machine learning models.

19. The non-transitory computer-readable medium of claim 18, wherein the first plurality of machine learning models comprise:

a text detection model configured to detect a line of text of the XML content, a bounding box direction classification model configured to directionally align the line of text;

a text recognition model configured to identify text characters in the line of text; and a word splitter model configured to identify words in the line of text; and wherein each machine learning model is further trained using a second training data comprising XML content in the particular font.

20. The non-transitory computer-readable medium of claim 19, wherein the selection of the particular font for the second training data is a user-based selection.

\* \* \* \* \*